US012583170B1

(12) United States Patent

Aguilar Mendez et al.

(10) Patent No.: US 12,583,170 B1
(45) Date of Patent: *Mar. 24, 2026

(54) ALIGNER MANUFACTURING METHODS

(71) Applicant: Align Technology, Inc., San Jose, CA (US)

(72) Inventors: David Aguilar Mendez, Ciudad Juárez (MX); Luis Carlos Martínez González, Ciudad Juárez (MX); Mario Alfonso Rito Martinez, Ciudad Juárez (MX)

(73) Assignee: Align Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/093,191

(22) Filed: Mar. 27, 2025

Related U.S. Application Data

(63) Continuation of application No. 16/817,132, filed on Mar. 12, 2020, now abandoned.

(Continued)

(51) Int. Cl.

| | |
|---|---|
| B29C 51/08 | (2006.01) |
| B29C 51/26 | (2006.01) |
| B29C 51/38 | (2006.01) |
| B29C 51/42 | (2006.01) |
| B29C 51/00 | (2006.01) |
| B29L 31/00 | (2006.01) |
| B33Y 10/00 | (2015.01) |

(52) U.S. Cl.
CPC .......... B29C 51/082 (2013.01); B29C 51/264 (2013.01); B29C 51/38 (2013.01); B29C 51/421 (2013.01); B29C 51/00 (2013.01); *B29L 2031/753* (2013.01); *B29L 2031/757* (2013.01); *B33Y 10/00* (2014.12)

(58) Field of Classification Search
CPC ..... B29C 51/00; B29C 51/082; B29C 51/264; B29C 51/38; B29C 51/421
See application file for complete search history.

(56) References Cited

U.S. PATENT DOCUMENTS

| | | | | | |
|---|---|---|---|---|---|
| 5,237,796 | A | * | 8/1993 | Bonkowski | ....... B29C 66/24221 53/442 |
| 5,324,186 | A | * | 6/1994 | Bakanowski | .......... A61C 13/20 425/DIG. 11 |

(Continued)

FOREIGN PATENT DOCUMENTS

| | | |
|---|---|---|
| CN | 109093710 A | 12/2018 |
| CN | 109421200 A | 3/2019 |

*Primary Examiner* — Seyed Masoud Malekzadeh
(74) *Attorney, Agent, or Firm* — Lowenstein Sandler LLP

(57) ABSTRACT

A method includes: receiving first and second digital models associated with a dental arch of a patient corresponding to first and second stages of orthodontic treatment; printing a first mold of a first dental arch based on the first digital model and a second mold of a second dental arch based on the second digital model; securing the first and second molds to a plate; heating a sheet of plastic to generate a heated sheet, and surrounding the sheet of plastic with a mask during the heating of the sheet of plastic to minimize heat transfer to other sheets of plastic; and simultaneously thermoforming the heated sheet over the first and second molds to form a first aligner shaped to fit the first dental arch and a second aligner shaped to fit the second dental arch.

20 Claims, 19 Drawing Sheets

Related U.S. Application Data

(60) Provisional application No. 62/818,848, filed on Mar. 15, 2019.

(56) References Cited

U.S. PATENT DOCUMENTS

| | | | |
|---|---|---|---|
| 6,210,162 B1 | 4/2001 | Chishti et al. | |
| 6,497,574 B1 | 12/2002 | Miller | |
| 6,957,118 B2 | 10/2005 | Kopelman et al. | |
| 6,976,627 B1 | 12/2005 | Culp et al. | |
| 7,092,784 B1 | 8/2006 | Simkins | |
| 7,220,124 B2 | 5/2007 | Taub et al. | |
| 7,236,842 B2 | 6/2007 | Kopelman et al. | |
| 7,245,977 B1 | 7/2007 | Simkins | |
| 7,335,024 B2 | 2/2008 | Wen | |
| 7,384,266 B2 | 6/2008 | Wen | |
| 7,435,084 B2 | 10/2008 | Liu et al. | |
| 7,472,789 B2 | 1/2009 | Wu et al. | |
| 7,476,100 B2 | 1/2009 | Kuo | |
| 7,481,647 B2 | 1/2009 | Sambu et al. | |
| 7,604,181 B2 | 10/2009 | Culp et al. | |
| 7,648,360 B2 | 1/2010 | Kuo | |
| 7,674,422 B2 | 3/2010 | Kuo | |
| 7,711,447 B2 | 5/2010 | Lu et al. | |
| 7,748,199 B2 | 7/2010 | Sankaran et al. | |
| 7,802,987 B1 | 9/2010 | Phan | |
| 7,819,659 B2 | 10/2010 | Wen | |
| 7,831,322 B2 | 11/2010 | Liu et al. | |
| 7,840,373 B2 | 11/2010 | Culp et al. | |
| 7,922,490 B2 | 4/2011 | Wen | |
| 7,957,824 B2 | 6/2011 | Boronvinskih et al. | |
| 8,019,465 B2 | 9/2011 | Spiridonov et al. | |
| 8,030,588 B2 | 10/2011 | Culp et al. | |
| 8,087,932 B2 | 1/2012 | Liu | |
| 8,636,513 B2 | 1/2014 | Wen | |
| 8,765,031 B2 | 7/2014 | Li et al. | |
| 8,776,391 B1 | 7/2014 | Kaza et al. | |
| 9,108,338 B2 | 8/2015 | Sirovskiy et al. | |
| 9,403,238 B2 | 8/2016 | Culp | |
| 10,336,102 B2 | 7/2019 | Cole | |
| 10,495,973 B2 | 12/2019 | Cole | |
| 10,783,629 B2 | 9/2020 | Parpara et al. | |
| 10,888,395 B2 | 1/2021 | Kopelman | |
| 11,189,021 B2 | 11/2021 | Shah et al. | |
| 11,295,444 B2 | 4/2022 | Cherkas et al. | |
| 11,453,156 B2* | 9/2022 | Aguilar Mendez ... | B29C 51/261 |
| 11,511,485 B2 | 11/2022 | Mojdeh et al. | |
| 11,524,445 B2* | 12/2022 | Feller .................. | A61C 7/08 |
| 11,534,277 B2 | 12/2022 | Chavez et al. | |
| 11,602,413 B2 | 3/2023 | Chen et al. | |
| 11,666,415 B2 | 6/2023 | Wang et al. | |
| 11,897,181 B2 | 2/2024 | Martínez González et al. | |
| 11,975,463 B2 | 5/2024 | Lukacs et al. | |
| 12,053,925 B2 | 8/2024 | Meenakshisundaram et al. | |
| 12,076,208 B2 | 9/2024 | Sato et al. | |
| 12,115,719 B2 | 10/2024 | O'Leary et al. | |
| 12,263,620 B2 | 4/2025 | Nishimuta et al. | |
| 12,263,632 B2* | 4/2025 | Martínez ............... | B29C 51/46 |
| 2004/0243361 A1 | 12/2004 | Steuben et al. | |
| 2006/0093982 A1 | 5/2006 | Wen | |
| 2006/0093987 A1 | 5/2006 | Wen | |
| 2006/0093993 A1 | 5/2006 | Wen | |
| 2006/0127850 A1 | 6/2006 | Wen | |
| 2006/0127857 A1 | 6/2006 | Zhenhuan et al. | |
| 2006/0127858 A1 | 6/2006 | Wen | |
| 2006/0127859 A1 | 6/2006 | Wen | |
| 2006/0127860 A1 | 6/2006 | Wen | |
| 2006/0172250 A1 | 8/2006 | Wen | |
| 2006/0199145 A1 | 9/2006 | Liu et al. | |
| 2007/0092853 A1 | 4/2007 | Liu et al. | |
| 2007/0243502 A1 | 10/2007 | Wen | |
| 2008/0083348 A1 | 4/2008 | Kuo et al. | |
| 2009/0148814 A1 | 6/2009 | Li et al. | |
| 2014/0363785 A1* | 12/2014 | Monicelli ........... | A61C 9/0006 |
| | | | 264/16 |
| 2017/0100211 A1 | 4/2017 | Wen | |
| 2017/0144360 A1* | 5/2017 | Moore, III ............... | A61C 7/08 |
| 2018/0000564 A1* | 1/2018 | Cam ........................ | A61C 7/36 |
| 2020/0055229 A1* | 2/2020 | Feller .................... | B33Y 80/00 |
| 2020/0147856 A1* | 5/2020 | Culp ...................... | B29C 51/24 |
| 2020/0290262 A1* | 9/2020 | Aguilar Mendez ... | B29C 51/261 |
| 2020/0306017 A1* | 10/2020 | Chavez ................. | B29C 64/188 |
| 2021/0237333 A1* | 8/2021 | Aguilar Mendez ... | B29C 51/261 |
| 2022/0110717 A1 | 4/2022 | Chavez et al. | |
| 2022/0160470 A1 | 5/2022 | Cole et al. | |
| 2022/0213258 A1* | 7/2022 | Yu ............................ | A61C 7/08 |
| 2022/0396024 A1* | 12/2022 | Martínez González ..................... | |
| | | | B29C 51/46 |
| 2023/0134234 A1 | 5/2023 | Meenakshisundaram et al. | |
| 2023/0264427 A1 | 8/2023 | Singh et al. | |
| 2023/0301752 A1 | 9/2023 | Wang et al. | |
| 2023/0301762 A1 | 9/2023 | Soltero et al. | |
| 2024/0005472 A1 | 1/2024 | Kopylov et al. | |
| 2024/0033989 A1* | 2/2024 | Martínez González ..................... | |
| | | | B29C 51/266 |
| 2024/0051225 A1 | 2/2024 | Dorfinger et al. | |
| 2024/0091906 A1 | 3/2024 | Singh et al. | |
| 2024/0100775 A1 | 3/2024 | Förster-Romswinckel et al. | |
| 2024/0140031 A1 | 5/2024 | Stromenger et al. | |
| 2024/0140043 A1 | 5/2024 | Cole et al. | |
| 2024/0140065 A1 | 5/2024 | Choudhary et al. | |
| 2024/0165889 A1 | 5/2024 | Choudhary et al. | |
| 2024/0227300 A1 | 7/2024 | Meenakshisundaram et al. | |
| 2024/0238904 A1 | 7/2024 | García Ramírez et al. | |
| 2024/0269935 A1 | 8/2024 | Okoshkin et al. | |
| 2024/0300174 A1 | 9/2024 | Dorfinger et al. | |
| 2024/0300185 A1 | 9/2024 | Meenakshisundaram et al. | |
| 2024/0352179 A1 | 10/2024 | Choudhary et al. | |
| 2024/0376039 A1 | 11/2024 | Choudhary et al. | |
| 2024/0400859 A1 | 12/2024 | Choudhary | |
| 2024/0425704 A1 | 12/2024 | Cole | |
| 2025/0011518 A1 | 1/2025 | Su | |
| 2025/0073001 A1* | 3/2025 | Vitiello ................... | B29C 51/10 |

* cited by examiner

Aligner Manufacturing System 100A

Holding Pin 152B

Holding Pin 152F

Holding Pin 152C

Holding Pin 152E

Holding Pin 152G

Holding Pin 152A

Holding Pin 152H

Holding Pin 152D

Pallet 150

Thermoforming Chamber 130

Pressure Device 132

Sheet of Plastic 154

Pallet 150

Mold 160A

Plate 162

Lifting Device 164

Mold 160B

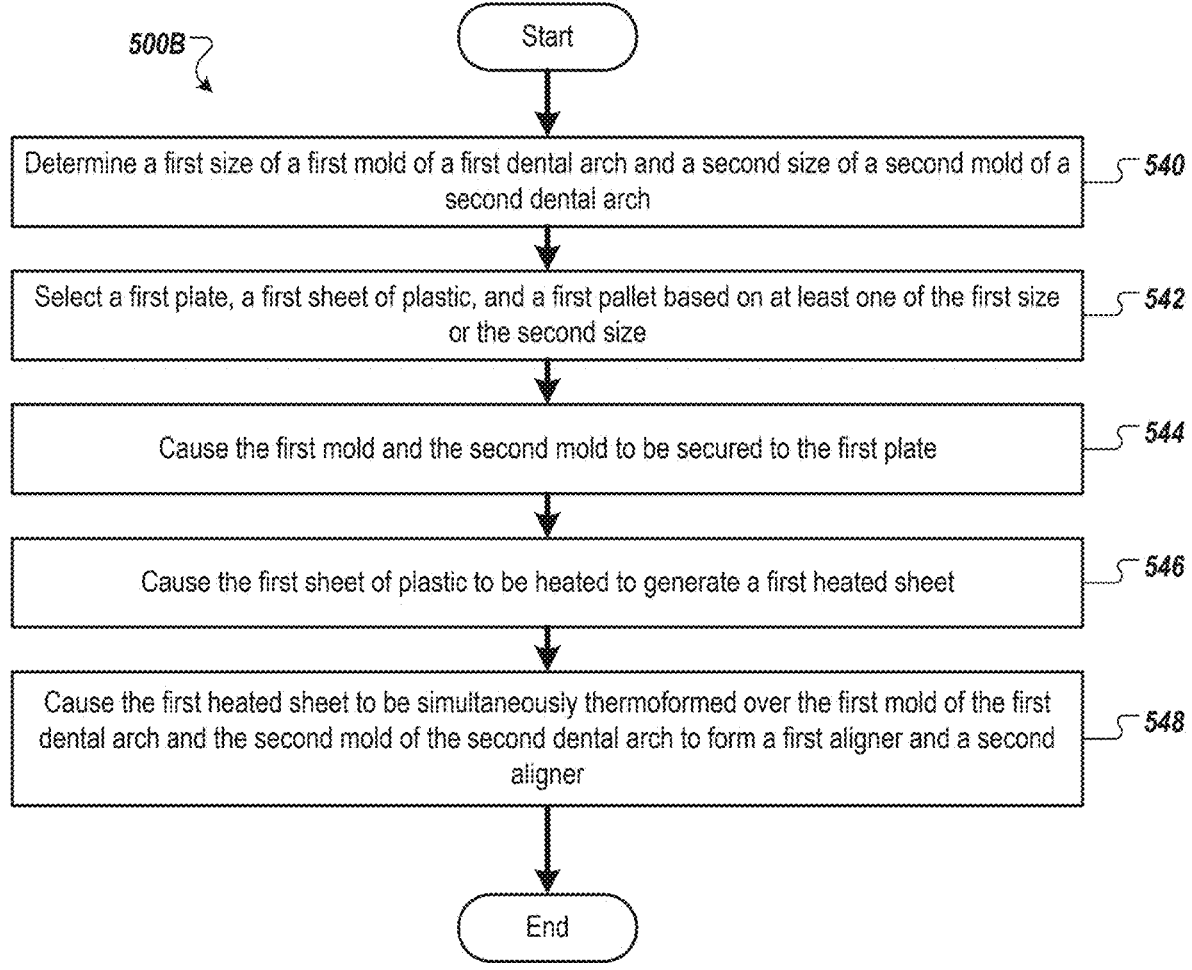

*500B*

Start

Determine a first size of a first mold of a first dental arch and a second size of a second mold of a second dental arch — 540

Select a first plate, a first sheet of plastic, and a first pallet based on at least one of the first size or the second size — 542

Cause the first mold and the second mold to be secured to the first plate — 544

Cause the first sheet of plastic to be heated to generate a first heated sheet — 546

Cause the first heated sheet to be simultaneously thermoformed over the first mold of the first dental arch and the second mold of the second dental arch to form a first aligner and a second aligner — 548

End

Figure 7C:
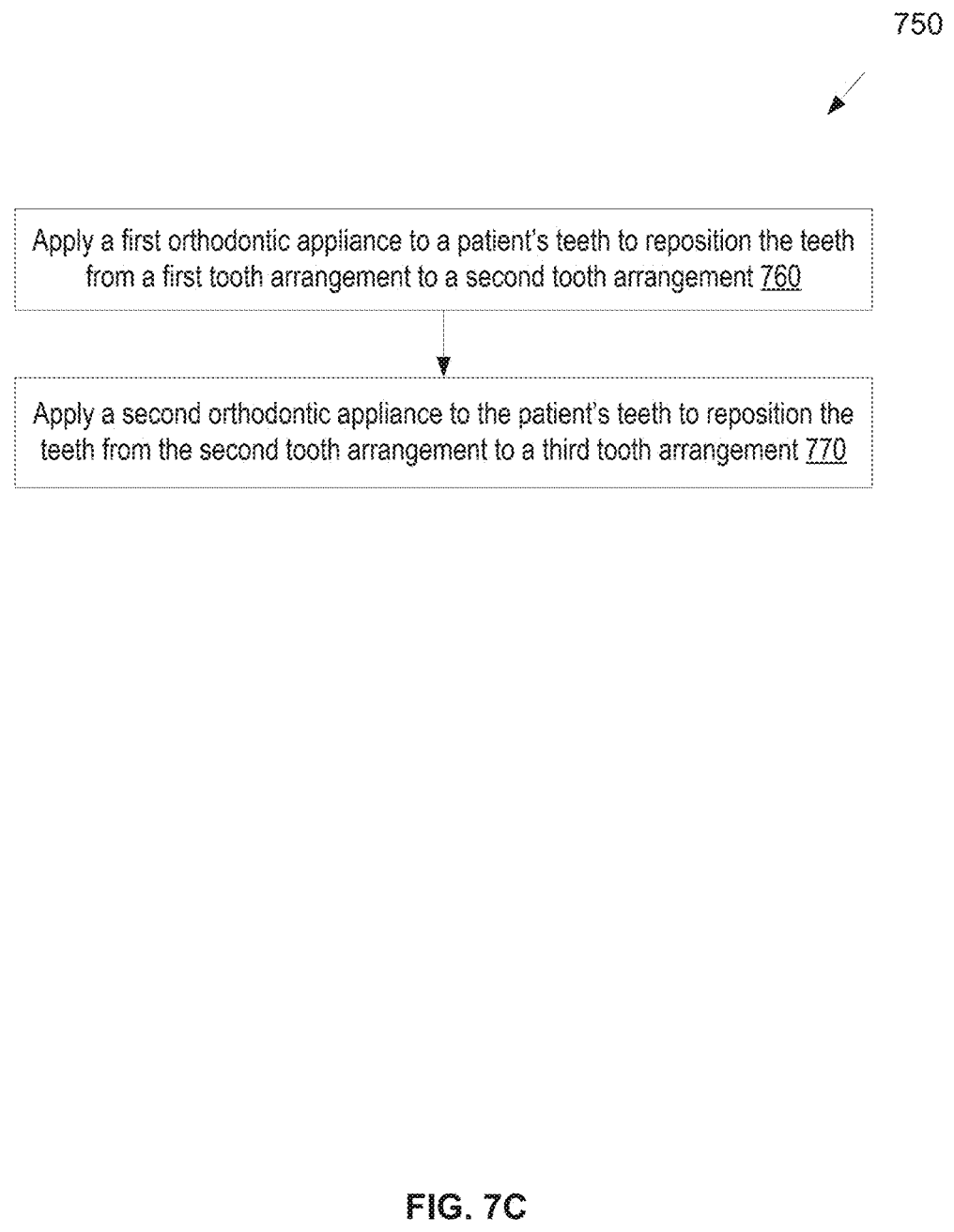

Apply a first orthodontic appliance to a patient's teeth to reposition the teeth from a first tooth arrangement to a second tooth arrangement 760

Apply a second orthodontic appliance to the patient's teeth to reposition the teeth from the second tooth arrangement to a third tooth arrangement 770

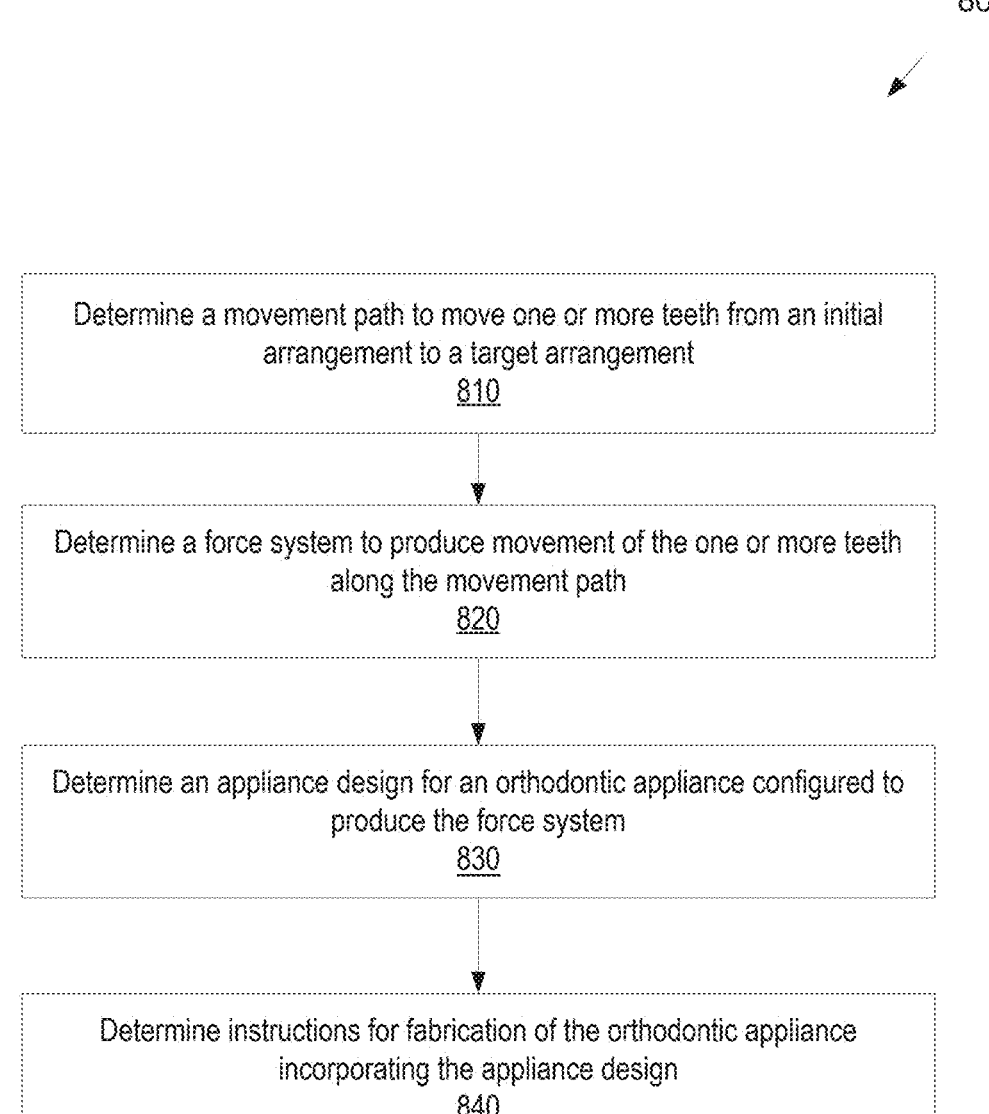

Determine a movement path to move one or more teeth from an initial
arrangement to a target arrangement
810

Determine a force system to produce movement of the one or more teeth
along the movement path
820

Determine an appliance design for an orthodontic appliance configured to
produce the force system
830

Determine instructions for fabrication of the orthodontic appliance
incorporating the appliance design
840

ALIGNER MANUFACTURING METHODS

RELATED APPLICATIONS

This application is a continuation application of U.S. patent application Ser. No. 16/817,132, filed Mar. 12, 2020, which claims benefit to U.S. Provisional Patent Application No. 62/818,848, filed Mar. 15, 2019, the contents of which are incorporated by reference in their entirety herein.

TECHNICAL FIELD

The technical field relates to the field of manufacturing dental appliances and, in particular, to thermoforming multiple aligners in parallel (e.g., simultaneously).

BACKGROUND

For some applications, shells are formed around molds to achieve a negative of the mold. The shells are then removed from the molds to be further used for various applications. One example application in which a shell is formed around a mold and then later used is corrective dentistry or orthodontic treatment. In such an application, the mold is of a dental arch for a patient and the shell is an aligner to be used for aligning one or more teeth of the patient.

Molds may be formed using rapid prototyping equipment such as 3D printers, which may manufacture the molds using additive manufacturing techniques (e.g., stereolithography) or subtractive manufacturing techniques (e.g., milling). The aligners may then be formed over the molds one at a time using thermoforming equipment. The forming of aligners one at a time using thermoforming equipment may result in a bottleneck in the aligner production process and may damage the aligners.

BRIEF DESCRIPTION OF THE DRAWINGS

The present invention is illustrated by way of example, and not by way of limitation, in the figures of the accompanying drawings.

FIG. 5A-B illustrate flow diagrams for methods of thermoforming multiple aligners simultaneously, according to certain embodiments.

FIG. 7C illustrates a method of orthodontic treatment using a plurality of appliances, according to certain embodiments.

FIG. 8 illustrates a method for designing an orthodontic appliance, according to certain embodiments.

DETAILED DESCRIPTION

Figure 1A:
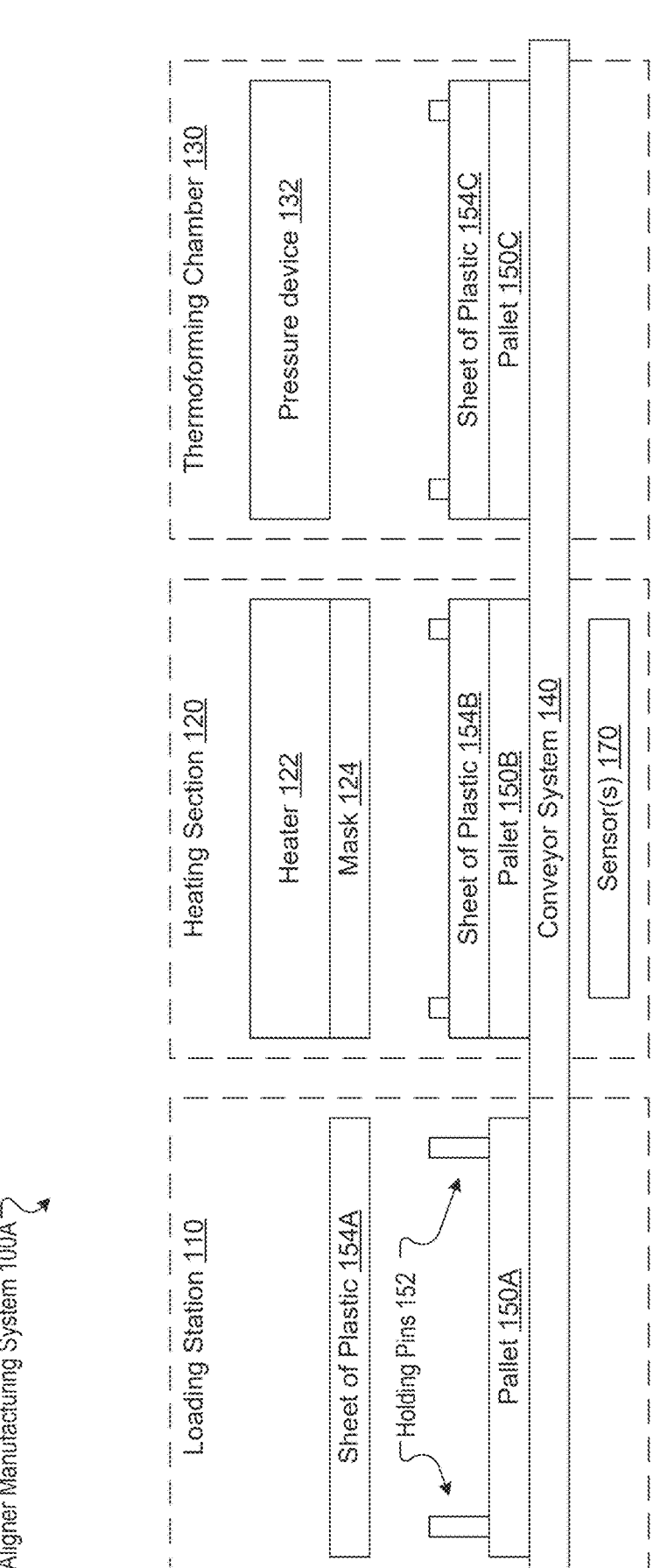
FIGS. 1A-B illustrate aligner manufacturing systems, according to certain embodiments.

Described herein are embodiments of simultaneously thermoforming multiple polymeric aligners (also referred to as an aligner, a shell, a plastic aligner, a plastic shell, an appliance, and an orthodontic appliance) or otherwise forming multiple polymeric aligners in parallel using a single thermoforming apparatus. Conventionally, automated production of aligners includes attaching a long continuous roll of plastic to a conveyor system, pulling the roll of plastic so that a first portion of the roll is heated at a first station, and pulling the roll of plastic further so that the heated first portion is thermoformed over a single mold at a second station (e.g., to form an aligner). The thermoformed first portion is later removed from the roll. As the roll of plastic is pulled so that the heated first portion enters the second station, a second portion enters the first station, and so forth. As a portion of the roll is heated at the first station, adjacent portions of the roll may also become heated (e.g., via convection, conduction, radiation, etc.) which may damage and reduce performance of the aligners. Thermoforming a portion of the roll over a single mold may result in wasted plastic (e.g., the remaining part of the portion of the roll that does not become the aligner). For example, about 70% of the plastic roll may be wasted by thermoforming a single aligner at a time. Thermoforming a single aligner at a time may become a bottleneck in the aligner production process.

Embodiments described herein enable simultaneous and/or parallel thermoforming of multiple aligners together in a single apparatus. An aligner manufacturing system may perform simultaneous and/or parallel thermoforming of multiple aligners in a single apparatus. A plate of the aligner manufacturing system may secure a first mold of a first dental arch and a second mold of a second dental arch to a plate. A heating section of the aligner manufacturing system may heat a sheet of plastic to generate a heated sheet. A thermoforming chamber of the aligner manufacturing system may simultaneously (e.g., at the same time) thermoform the heated sheet over the first mold of the first dental arch and the second mold of the second dental arch to form a first aligner shaped to fit the first dental arch and a second aligner shaped to fit the second dental arch.

In some embodiments, the plate may secure each mold in a predetermined position, a predetermined orientation, and predetermined distances from inner walls of the thermoforming chamber and/or predetermined distances from each other. For each mold, the plate includes a corresponding pin, a corresponding locking mechanism, and a corresponding keyway. Each pin may secure a corresponding mold in an x-direction and a y-direction. Each locking mechanism may secure a corresponding mold in the z-direction. Each keyway may maintain orientation of a corresponding mold.

In some embodiments, the aligner manufacturing system includes a pallet to secure the sheet of plastic. The pallet may include holding pins to pierce the sheet of plastic to secure the sheet of plastic during heating (e.g., via the heating section) and thermoforming (e.g., via the thermoforming chamber). Each corner of the pallet may have a corresponding holding pin to pierce the sheet of plastic.

In some embodiments, the heating section may include a mask to surround the sheet of plastic during heating of the sheet of plastic to minimize heat transfer from the heating section to other sheets of plastic. The mask may be heat resistant up to about 500 degrees Fahrenheit (° F.), may be an insulator, and may not adhere to the heated sheet of plastic. The mask may include polytetrafluoroethylene (PTFE). The heating section may include a ceramic heater, a convection oven, or an infrared heater, in embodiments.

In some embodiments, the sheet of plastic is sized to fit only the first mold and the second mold. The first mold and second mold may have minimum distances, ranges of distances, and/or ratios of distances from each other and from the inner walls of the thermoforming chamber. Alternatively, the sheet of plastic may be a large sheet of plastic that is rolled into a plastic roll.

Aspects of the present disclosure result in technological advantages of significant reduction in wasted plastic, significant increase in throughput, and significant improvement in quality. By thermoforming at least two aligners on a single sheet of plastic, the present disclosure results in significant reduction in wasted plastic. For example, the present disclosure may have more than 30% reduction in wasted plastic compared to conventional automated systems. By thermoforming at least two aligners on a single sheet of plastic, the present disclosure results in significant increase in throughput. For example, the present disclosure may have an 80% increased capacity compared to conventional automated systems. By using a mask to surround the sheet of plastic during heating, the present disclosure minimizes heat transfer to other sheets of plastic and improves quality of the aligners compared to conventional automated systems. Also, by using the dimensions, ranges, and/or ratios disclosed herein, the present disclosure may improve quality of the aligners compared to conventional automated systems. Aspects of the present disclosure may be provided in a new aligner manufacturing system. In some embodiments, an aligner manufacturing system may be retrofit (e.g., upgraded, modified) with aspects of the present disclosure.

FIG. 1A illustrate aligner manufacturing systems 100A-B (hereinafter aligner manufacturing systems 100), according to certain embodiments. FIG. 1A illustrates an aligner manufacturing system 100A, according to certain embodiments. The aligner manufacturing system 100 may include a loading station 110, a heating section 120, and a thermoforming chamber 130. A conveyor system 140 (e.g., conveyor belt, chain conveyor system, etc.) may move pallets 150 (e.g., pallets 150A-C, chain conveyor pallets) through the loading station 110, heating section 120, and thermoforming chamber 130. In some embodiments, two or more of the loading station 110, heating section 120, and thermoforming chamber 130 may be combined. In some embodiments, additional stations may be included before, after, or during the loading station 110, heating section 120, and/or thermoforming chamber 130.

In some embodiments, each pallet 150 may include holding pins 152. In the loading station 110, a sheet of plastic 154 may be placed on the holding pins 152 to pierce the sheet of plastic 154 with the holding pins to secure the sheet of plastic 154 to the pallet 150. For example, the loading station 110 may include a robot that activates a vacuum of the robot to pick up the sheet of plastic 154. The robot may push the sheet of plastic onto the holding pins 152, and the robot may deactivate the vacuum to leave the sheet of plastic secured to the pallet 150. The sheet of plastic may remain secured to the pallet 150 during heating via the heating section 120 and during thermoforming via the thermoforming chamber 130. In some embodiments, the pallet 150 has an upper surface that has a substantially rectangular surface area that forms four corners. The pallet 150 may include a holding pin 152 on the upper surface at each corner. The pallet 150 may include a holding pin 152 on the upper surface at a midpoint between each set of adjacent corners and/or at other positions along a perimeter of the pallet 150. The pallet 150 may have multiple holding pins 152 (e.g., six holding pins, eight holding pins) on the upper surface of the pallet 150 in some embodiments. The holding pins may have sharp points, and may pierce the sheet of plastic 154B to secure the sheet of plastic 154B in embodiments.

After the loading station 110, the conveyor system 140 may move a pallet 150 to the heating section 120. The heating section 120 may include a heater 122 and a mask 124 (e.g., heater mask 124). The heater 122 may be a ceramic heater, a convection oven, or an infrared heater in embodiments. The mask 124 may be heat resistant up to about 500° F. in embodiments. The mask 124 may be an insulator. The mask 124 may not adhere to the sheet of plastic 154 when the mask 124 and sheet of plastic 154 are heated. The mask may include polytetrafluoroethylene (PTFE) (e.g., Teflon™) in embodiments. Other materials that are heat resistant, have low thermal conductivity, and that will not adhere to the plastic sheet may also be used.

In some embodiments, the heating section 126 includes one or more heaters 122 (e.g., three heaters), where each heater 122 (e.g., heating element, infrared heater) heats a corresponding zone. The heating section 126 may include one or more sensors 170 (e.g., to measure temperature). In some embodiments, there is at least one sensor 170 per heater 122 (e.g., at least one sensor 170 per zone). A sensor 170 may be located below each heater 122 (e.g., below the sheet of plastic 154). The sensors 170 may determine the temperature of the sheet of plastic 154 and/or the air around the sheet of plastic 154. A heating profile of the sheet of plastic 154 may be determined based on sensor data from the sensors 170.

In some embodiments, one or more sensors 170 may be disposed in the heating section 120 (e.g., in the heating chamber, above the sheet of plastic 154, etc.). In some embodiments, a corresponding sensor 170 is located above or below each corner of the sheet of plastic 154 (e.g., within the heating space, within the interior perimeter of the mask 124). In some embodiments, one or more sensors 170 are located above or below a middle portion of the sheet of plastic 154 (e.g., between a first mold and a second mold).

In some embodiments, the sensors 170 may be disposed below the sheet of plastic 154. One or more sensors 170 may be disposed in a first plane and the sheet of plastic 154 may be disposed in a second plane. The second plane may be substantially parallel to the first plane. The second plane may be a distance above the first plane. The distance between a first sensor 170 and a second sensor 170 may be less than the distance between the first plane and the second plane. In some embodiments, the distance between a first sensor 170 and a second sensor 170 is about one tenth the distance between the first plane and the second plane (e.g., sensor spacing is about one tenth the spacing between a sensor 170 and the sheet of plastic 154).

A processing device may receive the sensor data from the sensors 170. The processing device may determine whether one or more temperatures associated with the sheet of plastic 154 meet one or more threshold values (e.g., high enough of temperature, not too high of temperature, total time of heating, rate of increase of temperature, temperature in each of the zones is substantially the same, etc.). Responsive to determining that the one or more temperatures associated with the sheet of plastic 154 meet the one or more threshold values, the processing device may allow the heated sheet of plastic continue being formed into an aligner. Responsive to determining that one or more temperatures associated with the sheet of plastic 154 do not meet one or more threshold values (e.g., uneven temperature, overheating, underheating, etc.), the processing device may perform a corrective action. A corrective action may include one or more of causing the heated sheet of plastic 154 to be discarded, causing the sheet of plastic 154 to be reheated, recalibrating the heaters 122, interrupting one or more components (e.g., heaters 122) the aligner manufacturing system 100, providing an alert, changing the manufacturing parameters (e.g., controlling power fed to the heaters 122, controlling the heat to be in an acceptable range, controlling total time of heating, etc.), and/or the like.

The heating section 120 may move (e.g., via a pneumatic cylinder of the heating section 120) the mask 124 to interface with the sheet of plastic 154 on the pallet 150. The mask 124 may include features so that the mask 124 avoids interfacing with the holding pins 152 while the mask 124 surrounds the sheet of plastic 154. The mask 124 may surround the sheet of plastic 154 to minimize heat transfer from the heating section to other sheets of plastic 154. The heater 122 may heat the sheet of plastic 154 to about 336° F. without hanging of the sheet of plastic 154 (e.g., without sagging portions of the sheet of plastic) by using the mask 124. For example, the mask may surround a perimeter of the sheet of plastic and provide a force sandwiching the sheet of plastic between the mask 124 and the pallet 150B. The force may be applied approximately uniformly about the perimeter of the sheet of plastic, and may prevent or mitigate sagging and/or warping of the sheet of plastic during the heating process. By avoiding generation of hanging or sagging portions of the sheet of plastic 154, air leaks may be avoided during the thermoforming. The mask 124 may be removed from the sheet of plastic 154 after the heating is completed.

After the heating section 120, the conveyor system 140 may move the pallet 150 (e.g., with the heated sheet of plastic 154 secured to the pallet 150 via the holding pins 152) to the thermoforming chamber 130. The thermoforming chamber 130 may include a pressure device 132. In some embodiments, the pressure device 132 may be lowered to interface with at least a portion (e.g., of an upper surface of the heated sheet of plastic 154 and/or of an upper surface of the pallet 150 proximate the perimeter of the pallet 150). Molds 160 (e.g., at least a first mold 160A and a second mold 160B) may be secured to a plate 162 that is disposed on a lifting device 164. The pallet 150 may form a border, where the molds 160A-B and/or plate 162 may pass through the pallet (e.g., the pallet 150 creates a channel from the lower surface to the upper surface of the pallet 150 sized for the molds 160 and/or plate 162 to pass through the channel).

The lifting device 164 may lift the molds 160A-B and plate 162 to interface with a lower surface of the heated sheet of plastic 154 in the thermoforming chamber 130. The pressure device 132 may maintain a pressure level (e.g., high pressure, lower pressure, vacuum, substantially vacuum, etc.) at the upper surface of the heated sheet of plastic 154. The lifting device 164 may push the molds 160A-B against the lower surface of the heated sheet of plastic 154 to thermoform the heated sheet of plastic 154 to form aligners. Subsequent to thermoforming the heated sheet of plastic 154, the lifting device 164 may lower to allow the conveyor system 140 to move the pallet 150 and thermoformed sheet of plastic 154 out of the thermoforming chamber 130.

After the thermoforming chamber 130, the thermoformed sheet of plastic 154 may be moved (e.g., via conveyor system 140) to other sections of the aligner manufacturing system 100 for one or more of reading identifiers on the aligners, marking the aligners, dividing the aligners, trimming the aligners, etc.

The conveyor system 140 may continue to move pallets 150 from the loading station 110, to the heating section 120, and to the thermoforming chamber 130 to thermoform additional sets of aligners in parallel (e.g., simultaneously). For example, there may be a pallet 150A in the loading station 110, pallet 150B in the heating section 120, and a pallet 150C in the thermoforming chamber 130 at substantially the same time.

Embodiments are discussed with reference to simultaneous processing of pairs of aligners (e.g., using first mold 160A and second mold 160B). However, it should be understood that in alternative embodiments more than two aligners may be formed together using a single sheet of plastic. For example, three aligners, four aligners, five aligners, etc. may be formed in parallel on a single sheet of plastic. Additionally, embodiments are discussed with reference to the simultaneous thermoforming of multiple aligners. It should be understood that in some embodiments there may be a slight delay between the beginning of thermoforming a first aligner and thermoforming a second aligner and/or between the ending of thermoforming a first aligner and ending of thermoforming a second aligner. For example, first mold 160A may be slightly vertically offset from second mold 160B, which may cause the thermoforming of a first aligner by first mold 160A to start and end at a slightly different time from the thermoforming of a second aligner by second mold 160B. Accordingly, it should be understood that embodiments that are discussed with reference to simultaneous processing or manufacturing also include parallel processing or manufacturing that may not be simultaneous.

Figure 1B:
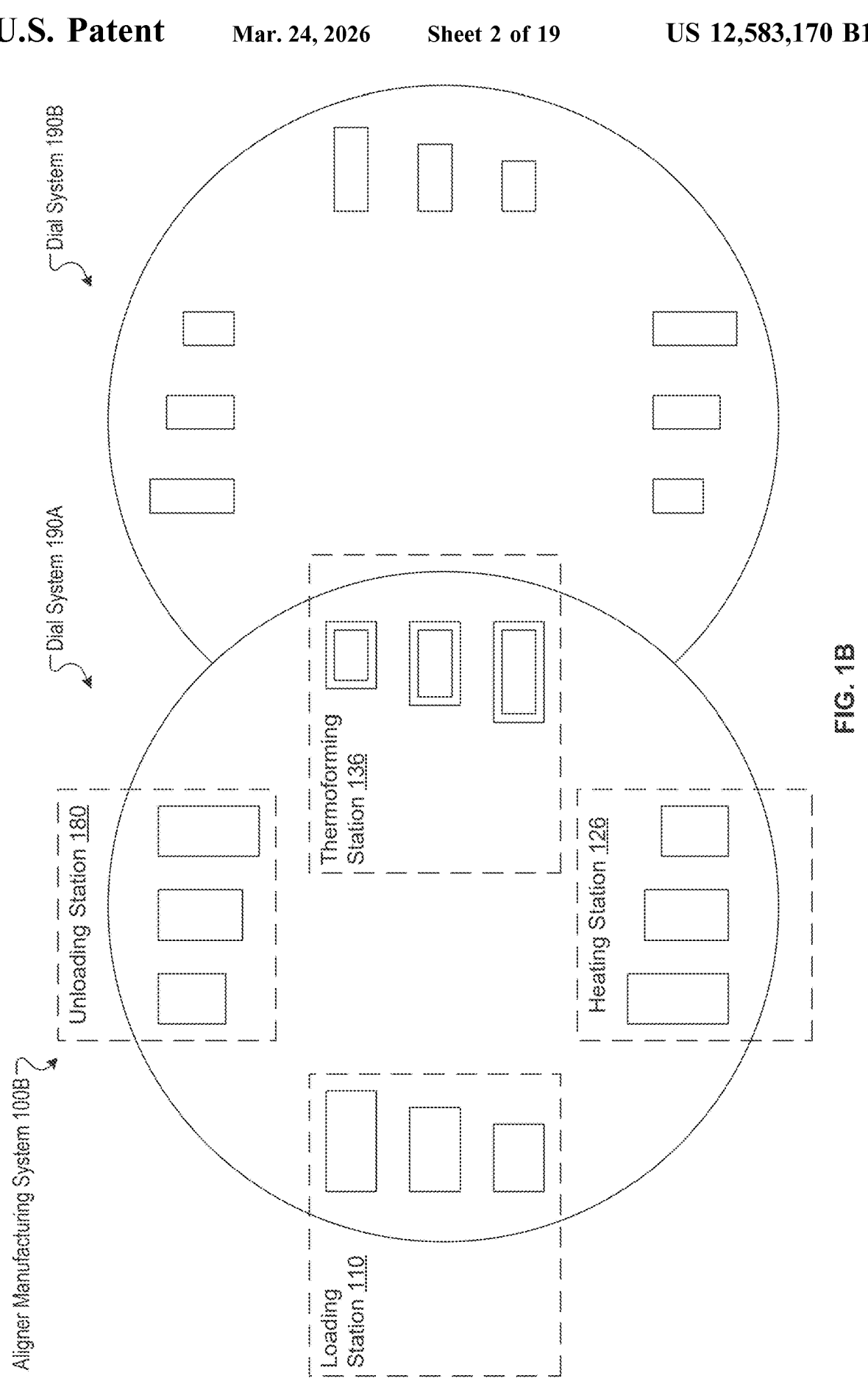

FIG. 1B illustrates an aligner manufacturing system 100B, according to certain embodiments. Elements with the same or similar numbering may have the same or similar functionality as those described in FIG. 1A. The aligner manufacturing system 100B may include a loading station 110, a heating station 126 (e.g., heating section 120), a thermoforming station 136 (e.g., one or more thermoforming chambers 130), and an unloading station 180. One or more dial systems 190 may be used to form the aligners. A dial system 190A may rotate to move pallets 150 (e.g., pallets 150A-C) through the loading station 110, heating station 126, thermoforming station 136, and unloading station 180. A dial system 190B may be used to load the plate 162 and/or molds 160 onto a lifting device 164. In some embodiments, two or more of the loading station 110, heating station 126, thermoforming station 136, and unloading station 180 may be combined. In some embodiments, additional stations may be included before, after, or during the loading station 110, heating station 126, thermoforming station 136, and/or unloading station 180.

The dial system 190A be configured to receive different sizes of pallets 150 (e.g., three sizes of pallets). Each pallet 150 may be configured for multiple molds (e.g., two molds). A size of pallet 150 may be selected based on the size of the largest mold to be used with the pallet 150. Responsive to the largest mold to be used with the pallet 150 meeting a first threshold size, a first size of pallet 150 may be selected. Responsive to the largest mold to be used with the pallet 150 meeting a second threshold size, a second size of pallet 150 may be selected. Responsive to the largest mold to be used with the pallet 150 meeting a third threshold size, a third size of pallet 150 may be selected. For each size of pallet 150, there may be a corresponding size of sheet of plastic 154, a corresponding pressure device 132, a corresponding plate 162, a corresponding lifting device 164, and/or the like.

In some embodiments, groups of two or more pallets 150 (e.g., three pallets 150) of different sizes are located on the dial system 190A proximate each other. Responsive to the dial system 190A rotating, a first group of the two or more pallets 150 is moved into the loading station 110. Responsive to the largest mold to be used meeting a threshold size, a particular size of sheet of plastic 154 is placed on a particular size of pallet 150.

After securing the sheet of plastic 154 to the pallet 150, the dial system 190A is rotated and the first group of two or more pallets 150 of different sizes is moved into the heating station 126. A heater 122 and mask 124 are moved to heat the sheet of plastic 154 secured to the pallet 150. In some embodiments, the same heater 122 and mask 124 are used to heat a sheet of plastic 154 secured to any of the two or more pallets 150. In some embodiments, there are three heaters 122 and three masks 124 that each correspond to a different sized pallet 150 and only the heater 122 above the pallet 150 that is securing a sheet of plastic 154B is actuated (e.g., lowered, caused to perform a heating function, etc.).

After heating the sheet of plastic 154 that is secured to the pallet 150, the dial system 190A is rotated and the first group of two or more pallets 150 of different sizes is moved into the thermoforming station 136. The thermoforming station may include the same number of thermoforming chambers 130, pressure devices 132, plates 162, and/or lifting devices 164 as the number of pallets 150. Each thermoforming chamber 130, pressure device 132, plate 162, and/or lifting device 164 may be sized for the corresponding pallet 150. In some embodiments, only the thermoforming chamber 130, pressure device 132, and/or lifting device 164 corresponding to the pallet 150 securing a heated sheet of plastic 154 are actuated. A single lifting device 164 may be used for the two or more pallets 150. In some embodiments, the lifting device 164 is configured to receive and lift two or more plates 162, each sized for a corresponding pallet 150 (e.g., all two or more plates 162 are lifted at the same time by the lifting device 164). In some embodiments, the lifting device 164 is configured to receive a single plate 162 and move the plate 162 to the corresponding pallet 150 that is securing a sheet of plastic. In some embodiments, the thermoforming station 136 has two or more thermoforming chambers 130. In some embodiments, the thermoforming station 136 has a single thermoforming chamber 130 that is aligned with the pallet 150 that is securing a sheet of plastic 154.

After thermoforming the heated sheet of plastic 154 that is secured to the pallet 150, the dial system is rotated and the first group of two or more pallets 150 of different sizes is moved into the unloading station 180. The unloading station 180 may one or more of read one or more identifiers (e.g., patient identifier (PID, stage, etc.), laser mark the thermoformed sheet of plastic 154 (e.g., aligner), trim the one or more aligners form the thermoformed sheet of plastic 154, unload the thermoformed sheet of plastic 154 (e.g., aligners) from the plate 162, and/or the like. In some embodiments, the unloading station 180 may include one or more substations and the dial system 190A may be rotated to move the first group of two or more pallets 150 from one substation to another. For example, one or more identifiers of the thermoformed sheet of plastic 154 may be read at a first substation, the dial system 190A is rotated, the thermoformed sheet of plastic 154 is laser marked at a second substation, the dial system 190A is again rotated, the thermoformed sheet of plastic 154 is unloaded (e.g., along with the molds, without the molds) from the plate 162, and the dial system 190A is again rotated (e.g., to locate the first group of two or more pallets 150 in the loading station 110).

In some embodiments, the aligner manufacturing system 100B includes multiple dial systems 190. A dial system 190B may be located under the dial system 190A. The dial system 190B may be used to locate the lifting device 164, plate 162, and/or one or more molds 160 under the corresponding pallet 150 securing a sheet of plastic 154 in the thermoforming station 136. The lifting device 164 may lift the plate 162 securing one or more molds 160 to the pallet 150 securing the sheet of plastic 154 to thermoform the sheet of plastic 154 on the one or more molds. The dial system 190B may rotate through one or more different stations. In some embodiments, a plate 162 may be loaded to the dial system 190B at a station of the dial system 190B. In some embodiments, one or more molds 160 may be loaded on a plate 162 at a station of the dial system 190B. In some embodiments, the one or more molds 160 and/or the plate 162 are unloaded from the dial system 190B at a station of the dial system 190B. In some embodiments, the lifting device 164 remains located under the thermoforming station 136 and the lifting device 164 lifts the plate 162 securing the molds 160 from the dial system 190B to the pallet 150 securing the sheet of plastic 154. In some embodiments, the lifting device 164 rotates with the dial system 190B.

In some embodiments, the dial system 190A and the dial system 190B rotate in the same direction (e.g., both clockwise, both counter-clockwise). In some embodiments, the dial system 190A and the dial system 190B rotate in opposite directions. In some embodiments, the dial system 190A and the dial system 190B rotate simultaneously or substantially simultaneously (e.g., at the same speed, etc.). In some embodiments, the dial system 190A and the dial system 190B are rotated separately (e.g., the pallet 150 securing a sheet of plastic 150 may be rotated to the thermoforming station 136 at a time different than the plate 162 securing the one or more molds 160 is rotated under the thermoforming station 136).

In some embodiments, the dial system 190A may include multiple groups of two or more pallets 150. A first group may be located in the loading station 110, a second station may be located at the heating station 126, a third group may be located in the thermoforming station 136, and a fourth group may be located in the unloading station 180. In some embodiments, different stations of the dial system 190A are being interacted with at substantially the same time. In some embodiments, a sheet of plastic 154A is being placed on a pallet 150A, a heater 122 is heating the sheet of plastic 154B loaded on a pallet 150B, and a pressure device 132 is thermoforming a heated sheet of plastic 154C secured to a pallet 150C at substantially the same time. In some embodiments, different stations of the dial system 190B are being interacted with at substantially the same time.

The operations of forming an aligner by using a conveyor belt 140 may be applied to forming an aligner by using one or more dial systems 190A-B.

Figure 2A:
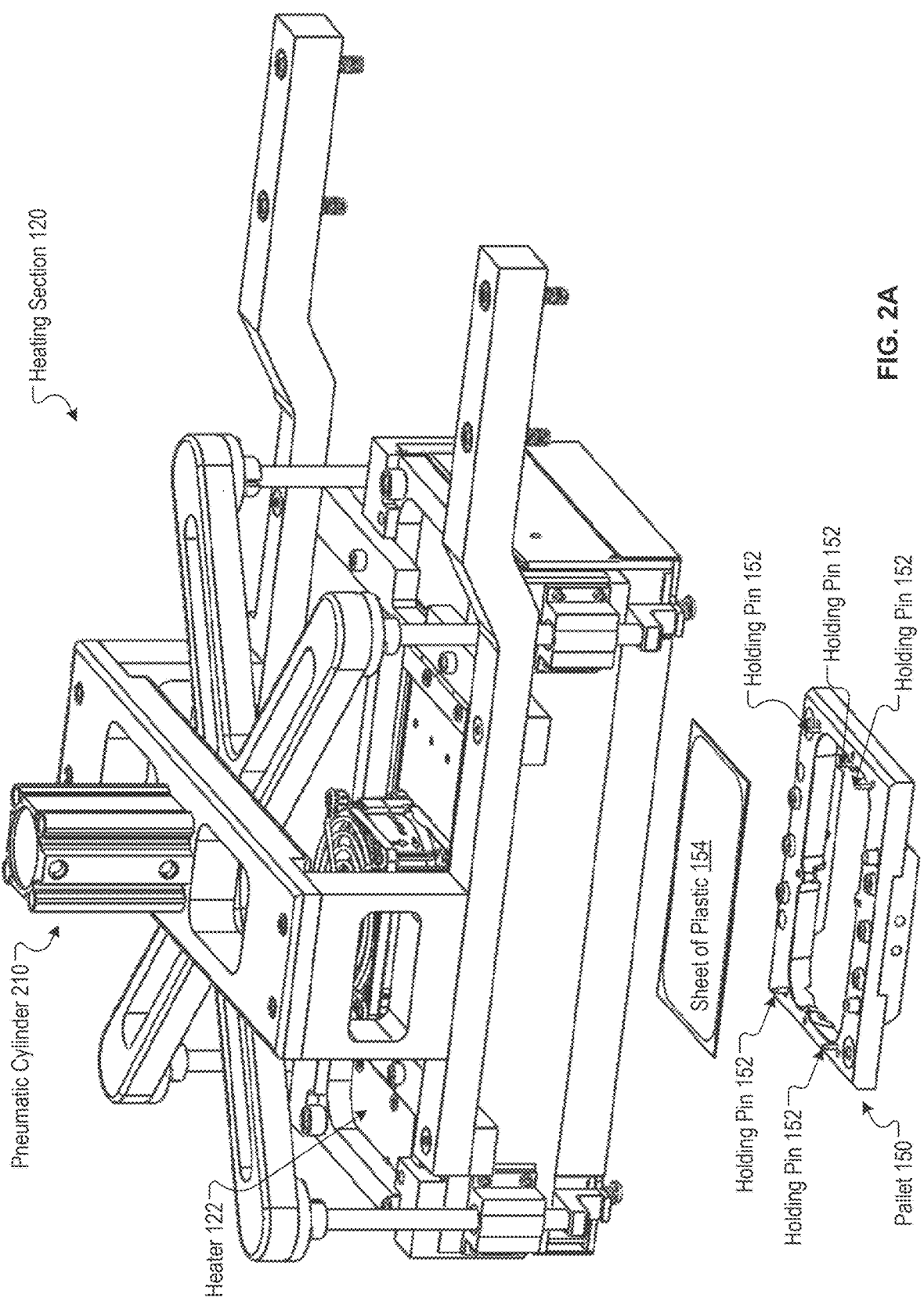
FIGS. 2A-B illustrate heating sections of aligner manufacturing systems, according to certain embodiments.
Figure 2B:
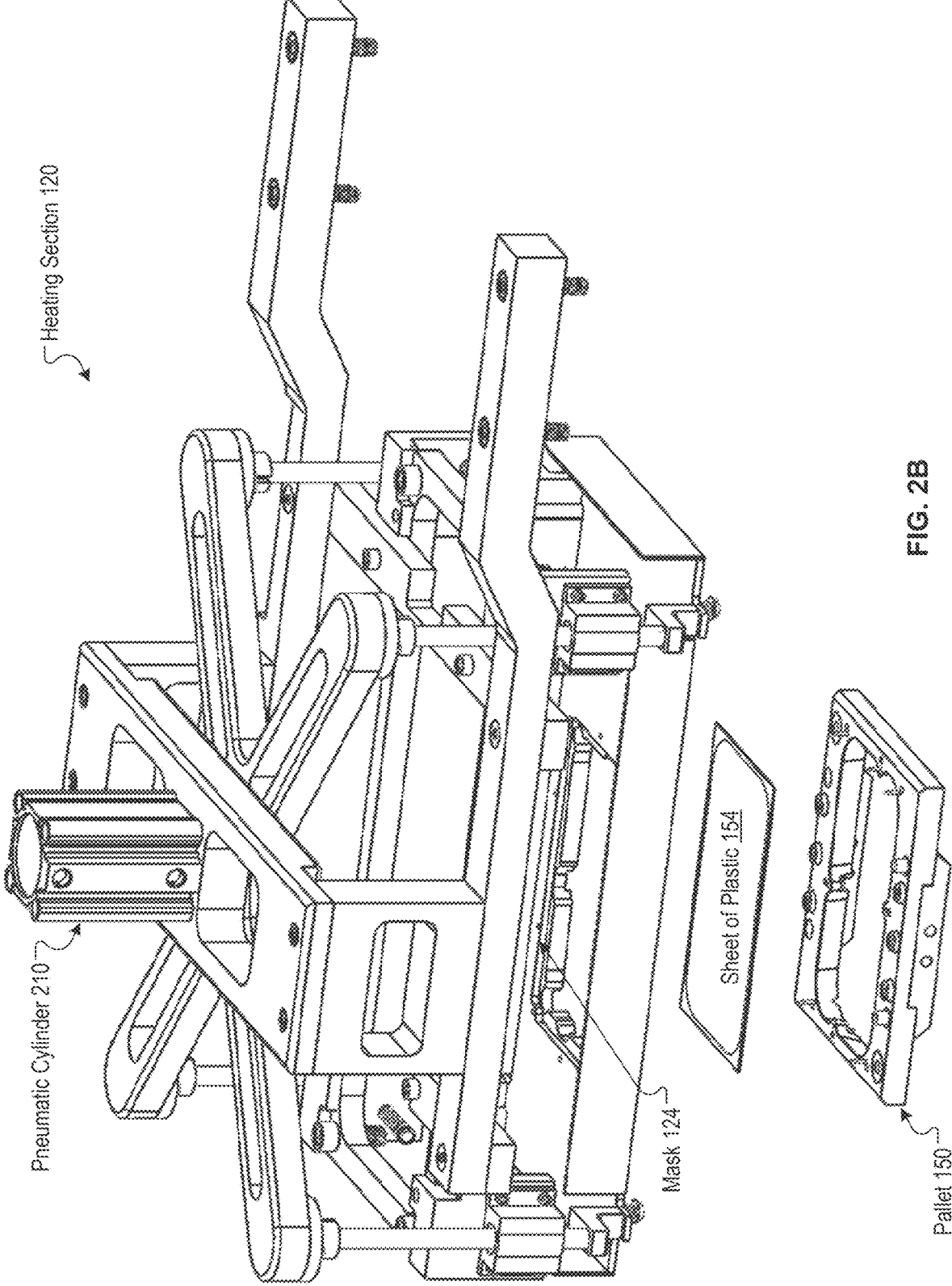

FIGS. 2A-B illustrate heating sections 120 of aligner manufacturing systems 100, according to certain embodiments. The heating section 120 may include a pneumatic cylinder 210, a heater 122, a mask 124, a sheet of plastic 154 inserted into the heating section 120, and a pallet 150. As shown in FIG. 2A, the heater 122 may be located proximate the sheet of plastic 154 disposed on a pallet 150. As shown in FIG. 2A, the mask 124 may be disposed between the heater 122 and the sheet of plastic disposed on the pallet 150. The mask 124 may lower to interface with the sheet of plastic 154 disposed on the pallet 150.

Figure 2C:
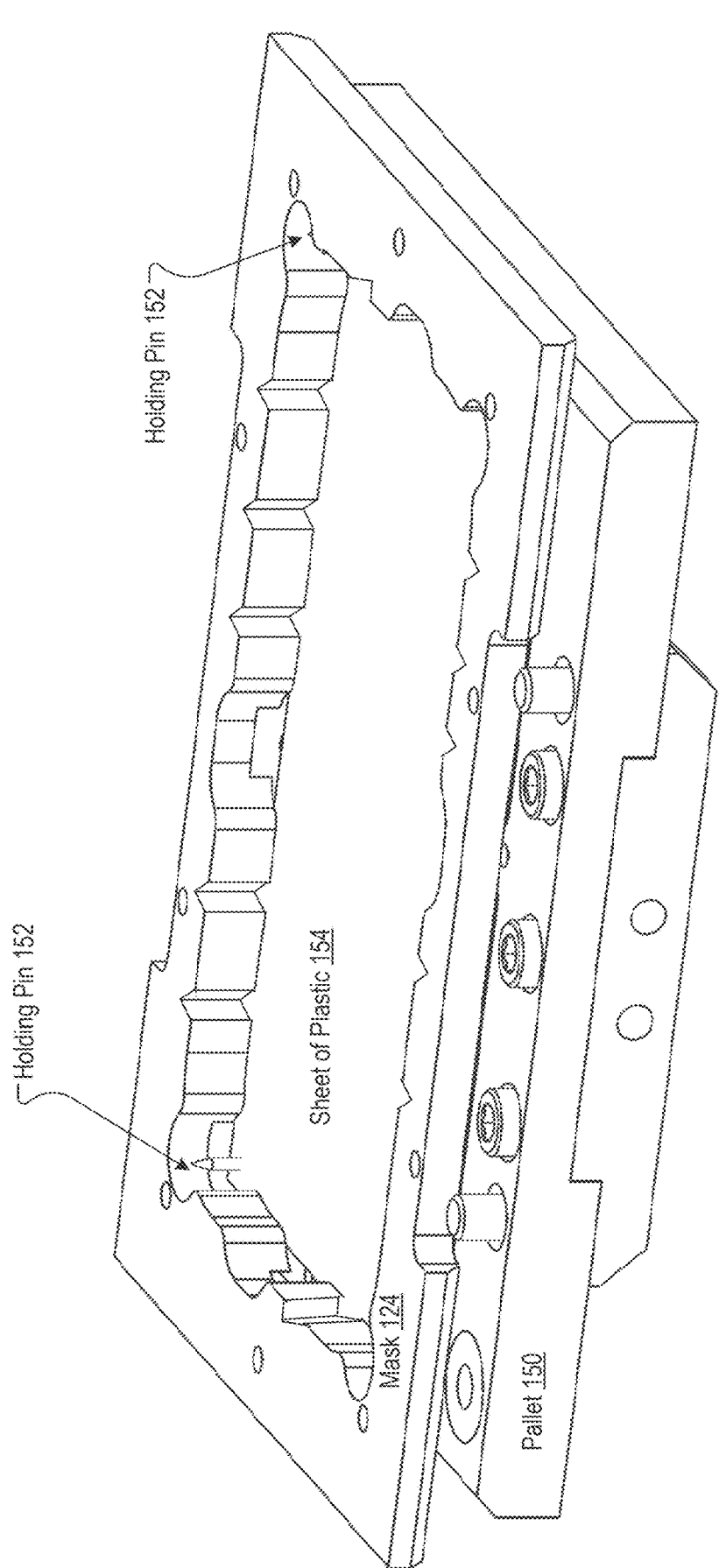
FIG. 2C illustrates a pallet, sheet of plastic, and mask of an aligner manufacturing system, according to certain embodiments.

FIG. 2C illustrates a pallet 150, sheet of plastic 154, and mask 124 of an aligner manufacturing system 100, according to certain embodiments. The mask 124 may provide a thermal seal between the heater 122 and the sheet of plastic 154 on the pallet 150. The mask 124 may be a border that forms a channel from the lower surface to the upper surface of the mask 124. The channel of the mask 124 may be substantially similar in size to the channel of the pallet 150. The mask 124 may be shaped to not interfere with the holding pins 152 (e.g., the mask 154 may have recesses to go around the holding pins 152). In some embodiments, the mask 124 substantially covers the pallet 150 so that the mask 124 is disposed on substantially all portions of the sheet of plastic 154 that are disposed on the pallet 150.

Figure 2D:
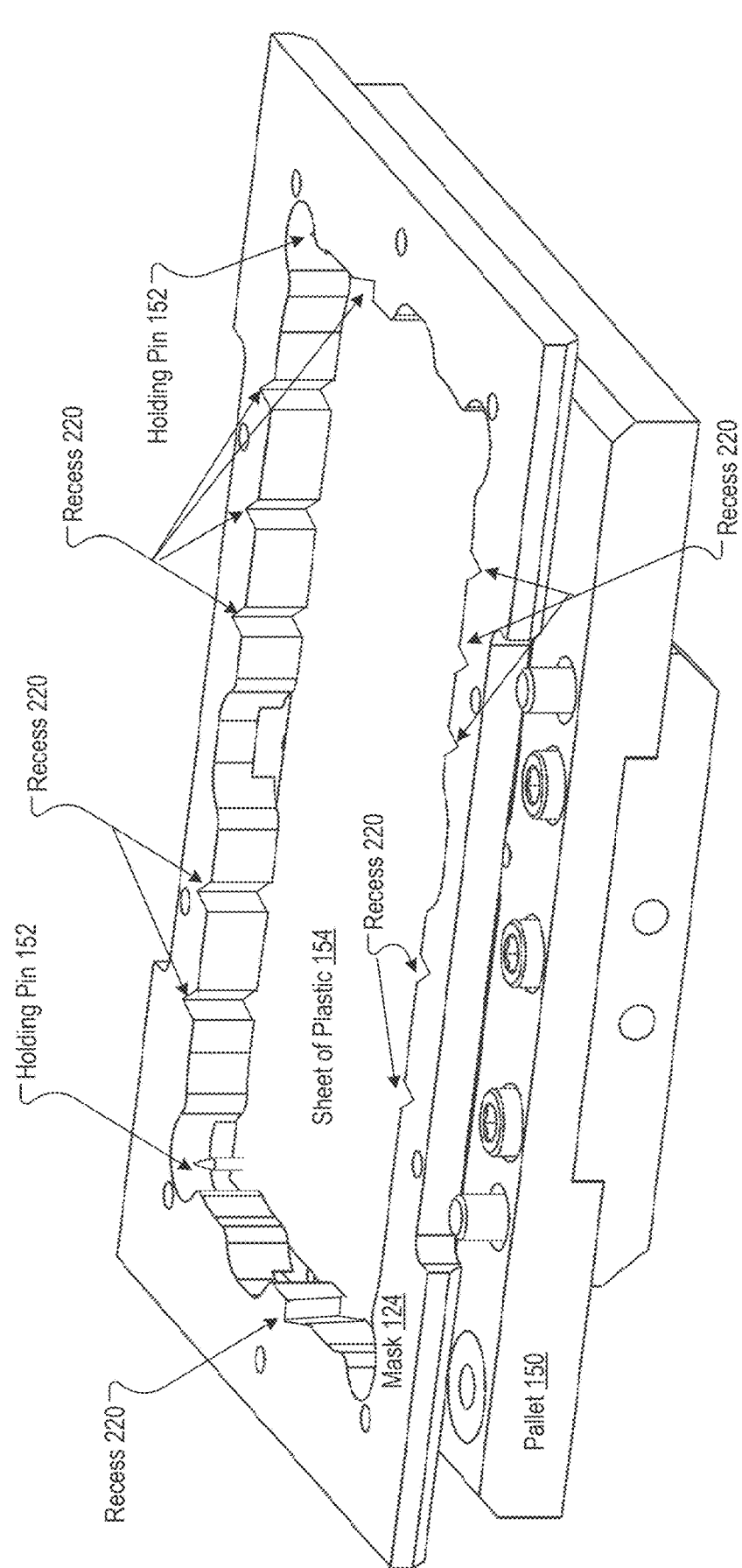
FIG. 2D illustrates a pallet, sheet of plastic, and mask of an aligner manufacturing system, according to certain embodiments.

FIG. 2D illustrates a pallet 150, sheet of plastic 154, and mask 124 of an aligner manufacturing system, according to certain embodiments. The mask 124 may have an upper surface configured to couple with a heater of an aligner manufacturing system 100. The mask 124 may have a lower surface configured to be disposed on a sheet of plastic 154. The sheet of plastic is to be disposed between a pallet 150 and the lower surface of the mask 124. The mask may have inner sidewalls forming recesses 220 (e.g., cut-outs, indents, etc.). A first portion of the sheet of plastic 154 that is disposed on the pallet 150 is exposed by the recesses 220 to heat transfer from the heater (e.g., the first portion is heated by the heater). The heated first portion of the sheet of plastic 154 provide a seal between the sheet of plastic 154 and the pallet 150 and/or one or more portions of the thermoforming chamber 130. The mask 124 is to minimize the heat transfer from the heater to a second portion of the sheet of plastic 154 that is disposed on the pallet and is covered by heat mask 124 (e.g., portions that are not exposed by the recesses).

The recesses 220 may be substantially uniformly formed (e.g., substantially evenly spaced) along the inner sidewalls to provide the heat transfer from the heater to the first portion of the sheet of plastic 154 to seal the sheet of plastic to the pallet for thermoforming. The recesses substantially uniformly formed recesses may provide for substantially uniform heating to provide an improved seal.

In some embodiments, the recesses 220 have substantially vertical sidewalls. In some embodiments, the recesses 220 have planar (e.g., planar vertical) sidewalls. In some embodiments, the recesses 220 have curved (e.g., curved vertical, rounded vertical) sidewalls.

Figure 2E:
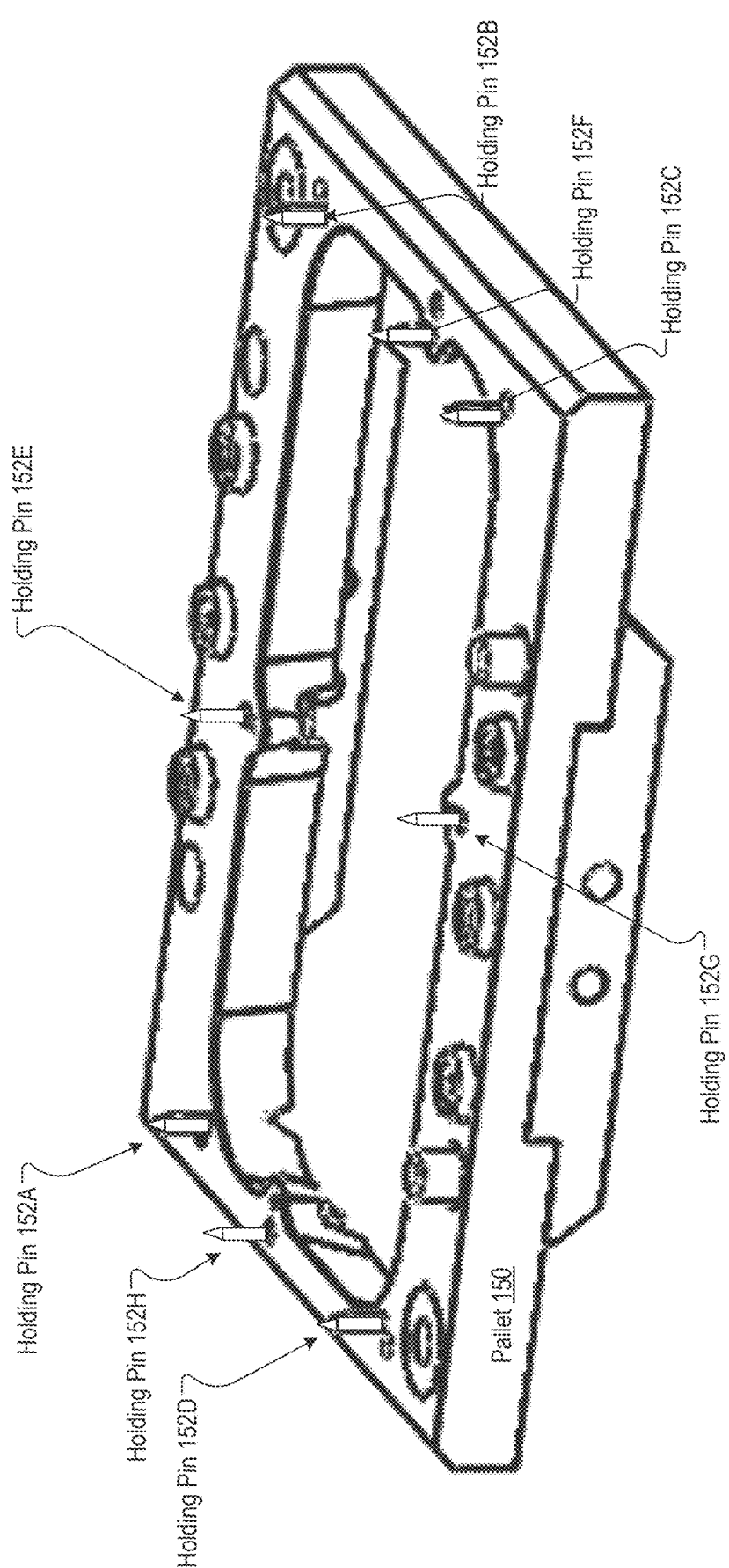
FIG. 2E illustrates a pallet, according to certain embodiments.

FIG. 2E illustrates a pallet 150, according to certain embodiments. The pallet 150 has an upper surface configured to receive a sheet of plastic 154. The pallet 150 also includes inner sidewalls sized and shaped to receive a plate 162 securing the first mold and the second mold for thermoforming of the sheet of plastic 154. The pallet 150 also includes holding pins 152 disposed on the upper surface of the pallet. The holding pins 152 are configured to pierce the sheet of plastic 154 to secure the sheet of plastic 154 during heating and thermoforming.

The inner sidewalls form a first inner corner of the pallet 150, a second inner corner of the pallet 150, a third inner corner of the pallet 150, and a fourth inner corner of the pallet 150. The holding pins 152 include a first holding pin 152A located on the upper surface proximate the first inner corner, a second holding pin 152B located on the upper surface proximate the second inner corner, a third holding pin 152C located on the upper surface proximate the third inner corner, and a fourth holding pin 152D located on the upper surface proximate the fourth inner corner. The holding pins 152 may also include a fifth holding pin 152E located on the upper surface between (e.g., substantially midway between) the first holding pin 152A and the second holding pin 152B, a sixth holding pin 152F located on the upper surface between (e.g., substantially midway between) the second holding pin 152B and the third holding pin 152C, a seventh holding pin 152G located on the upper surface between (e.g., substantially midway between) the third holding pin 152C and the fourth holding pin 152D, and an eighth holding pin 152H located on the upper surface between (e.g., substantially midway between) the fourth holding pin 152D and the first holding pin 152A.

In some embodiments, the pallet 150 has at least four holding pins 152. In some embodiments, the pallet 150 has at least six holding pins 152. In some embodiments, the pallet 150 has at least eight holding pins 152. The holding pins 152 may hold the sheet of plastic 154 in place (e.g., during heating and thermoforming).

Figure 3:
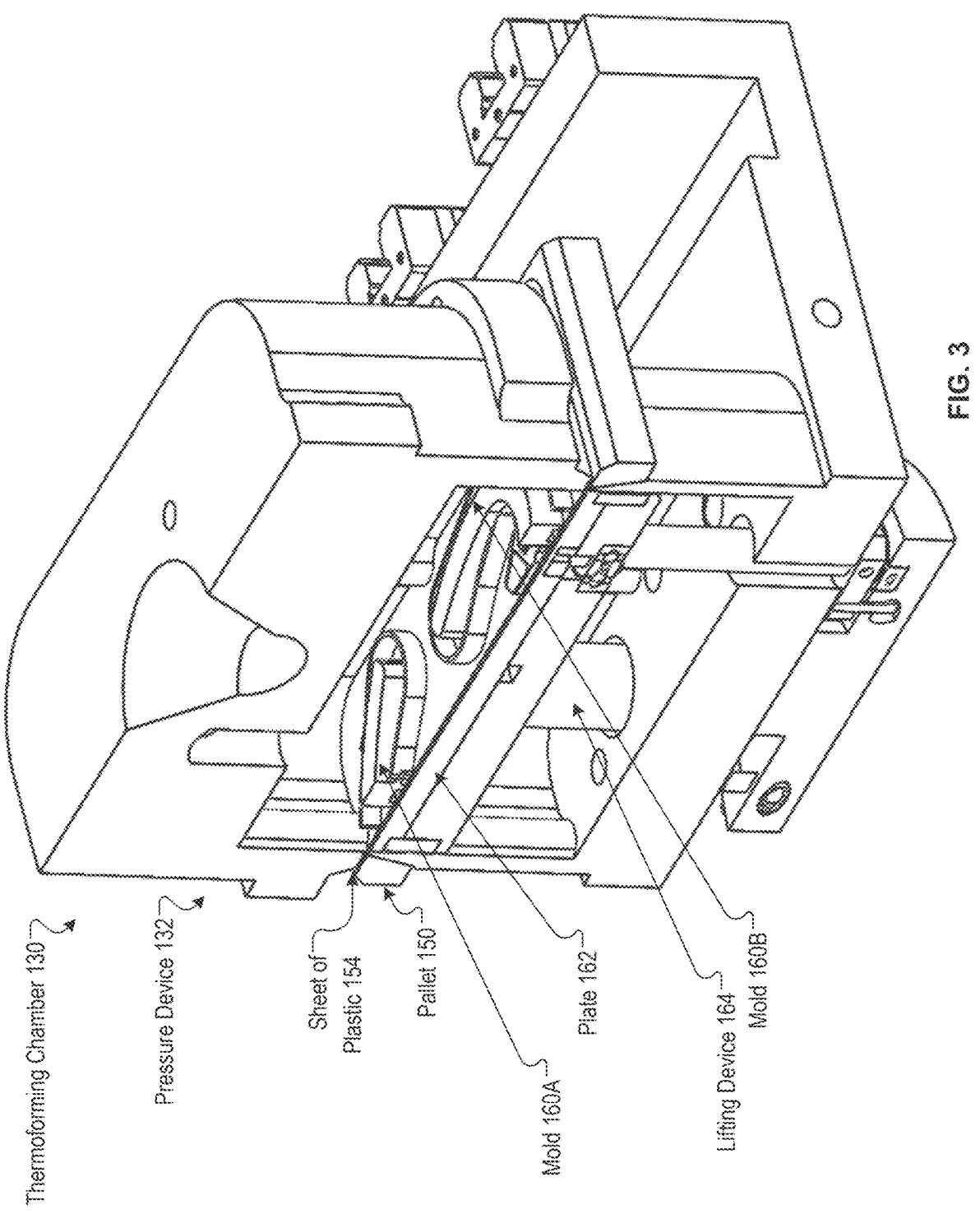
FIG. 3 illustrates a thermoforming chamber of an aligner manufacturing system, according to certain embodiments.

FIG. 3 illustrates a thermoforming chamber 130 of an aligner manufacturing system 100, according to certain embodiments. A heated sheet of plastic 154 may be secured to a pallet 150 by one or more holding pins 152 on the upper surface of the pallet 150. Molds 160A-B may be secured to an upper surface of a plate 162 that is coupled to a lifting device 164. A pressure device 132 of the thermoforming chamber 130 may lower onto an upper surface of an outer perimeter of the heated sheet of plastic 154 and/or pallet 150. The lifting device 164 may lift the plate 162 so that the molds 160A-B press against the lower surface of the heated sheet of plastic 154 with a specified amount of force while the pressure device 132 maintains a pressure (e.g., substantially vacuum). After a threshold amount of time, the lifting device 164 lowers plate 162, the pressure device 132 may lift from the sheet of plastic 154 secured to the pallet 150, and the pallet 150 (with the thermoformed sheet of plastic 154 secured to the upper surface of the pallet 150) may leave the thermoforming chamber 130.

Figure 4A:
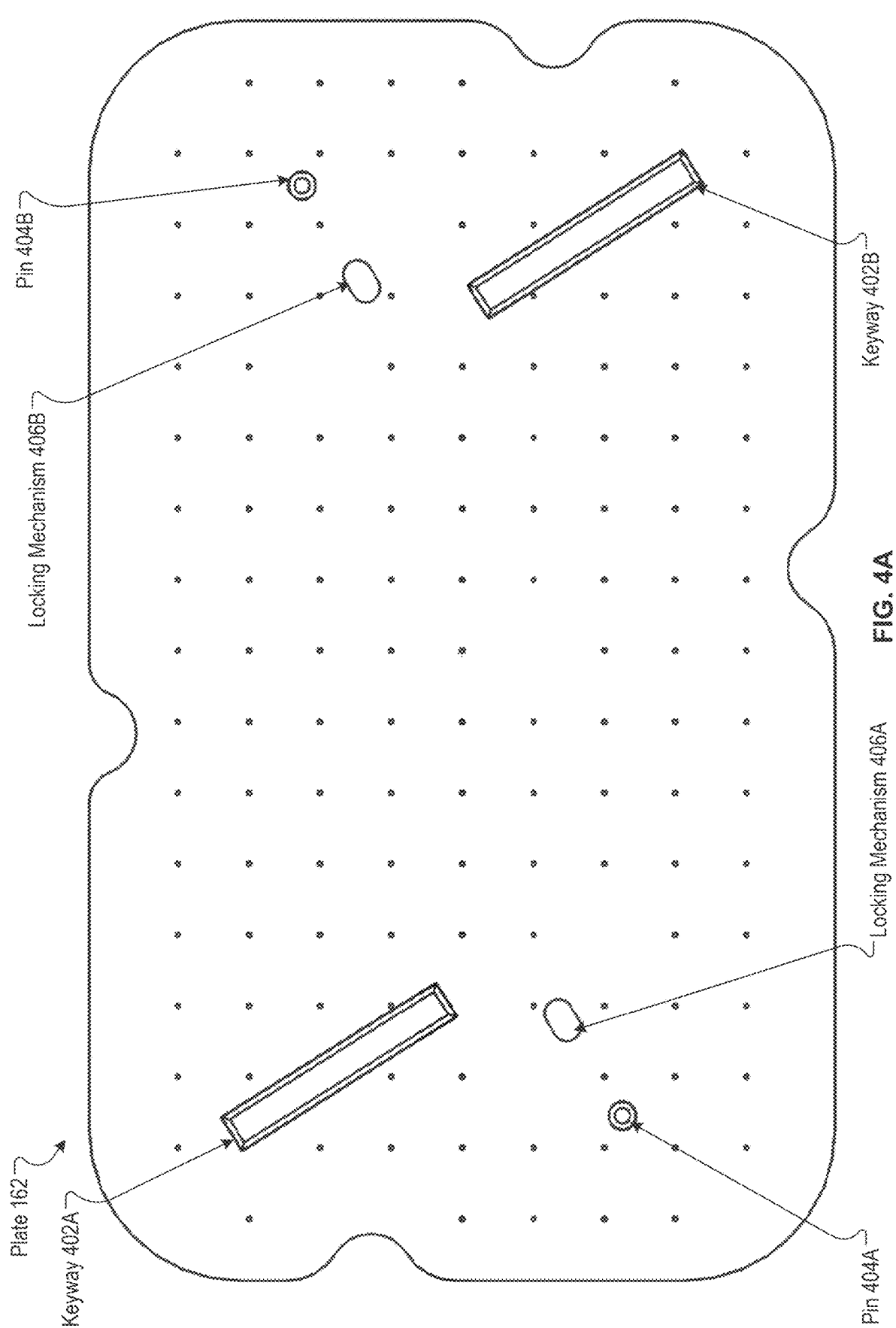
FIG. 4A illustrates a plate of an aligner manufacturing system, according to certain embodiments.

FIG. 4A illustrates a plate 162 of an aligner manufacturing system 100, according to certain embodiments. In some embodiments, for each mold, a plate 162 may include corresponding features including a corresponding keyway 402A-B, corresponding pin 404A-B, and corresponding locking mechanism 406A-B. The plate 162 may secure each mold 160A-B in a predetermined position, a predetermined orientation, and predetermined distances from inner walls of the thermoforming chamber 130 and/or from each other using the features.

Each keyway 402 may maintain orientation of a corresponding mold 160A-B. A lower surface of the mold 160A-B may have a feature (e.g., protrusion, recess) that interfaces with the keyway 402A-B so that the mold does not change orientation.

Each pin 404A-B may secure a corresponding mold 160A-B in an x-direction and a y-direction. Each mold 160A-B may have a recess (e.g., pin hole) formed by a lower surface of the mold 160A-B that interfaces with the pin 404A-B. The pin 404A-B interfacing with the recess may cause the mold 160A-B to not move in the x- and y-directions.

Each locking mechanism 406A-B may secure a corresponding mold 160A-B in the z-direction. For example, the locking mechanism may overlap an upper surface of the mold 160A-B so that the mold 160A-B does not move away from the plate 162. Each mold may form a hole (e.g., proximate a flat identification portion of the mold) that corresponds to the locking mechanism 406A-B. The mold 160A-B may be placed on the plate 162 so that a top portion of the locking mechanism 406A-B sticks through the hole and the top portion of the locking mechanism may be rotated to lock the mold 160A-B in the z-direction.

Figure 4B:
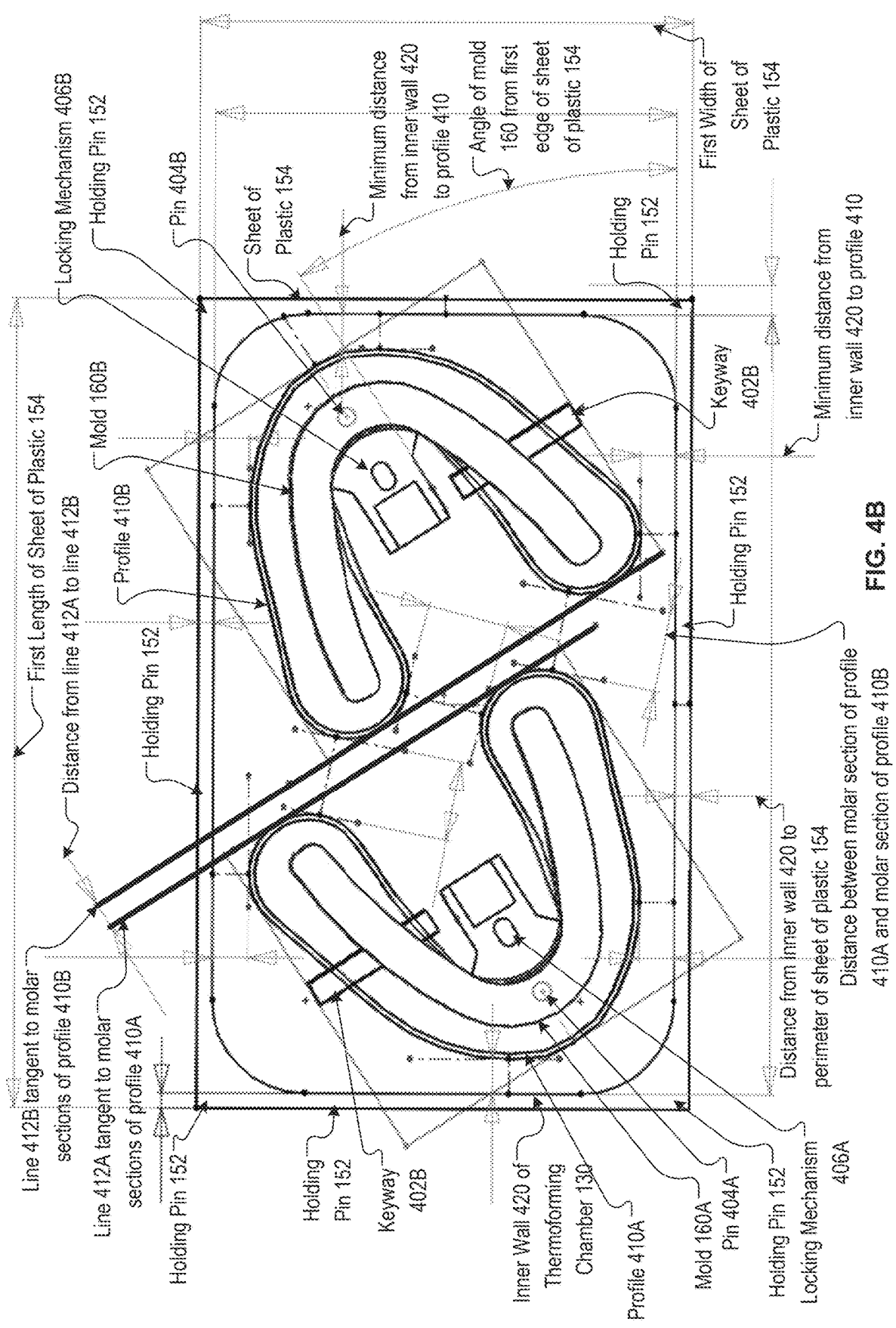
FIG. 4B illustrates molds on a plate of an aligner manufacturing system, according to certain embodiments.

FIG. 4B illustrates molds 160A-B on a plate 162 of an aligner manufacturing system 100, according to certain embodiments. The plate 162 may secure molds 160A-B in predetermined positions, predetermined orientations, and predetermined distances from inner walls 420 of the thermoforming chamber 130. The plate 162 may be sized to receive two molds 160A-B that each fit within a corresponding profile 410A-B (e.g., are not greater than a maximum mold size). The predetermined positions, orientations, and distances of each mold 160A-B and/or each profile 410A-B may improve the quality of the aligners (e.g., reduce defects). The dimensions described herein may have a tolerance that substantially matches the tolerance of the tooling (e.g., aligner manufacturing system 100, thermoforming chamber 130, etc.). In some embodiments, the tolerance of the dimensions described herein and/or the tolerances of the tooling may be at least 3 thousandths of an inch. In some embodiments, the profiles 410A-B are each the same size. Alternatively, profile 410A may have a different size (e.g., one or more different dimensions) than profile 410B.

Figure 4C:
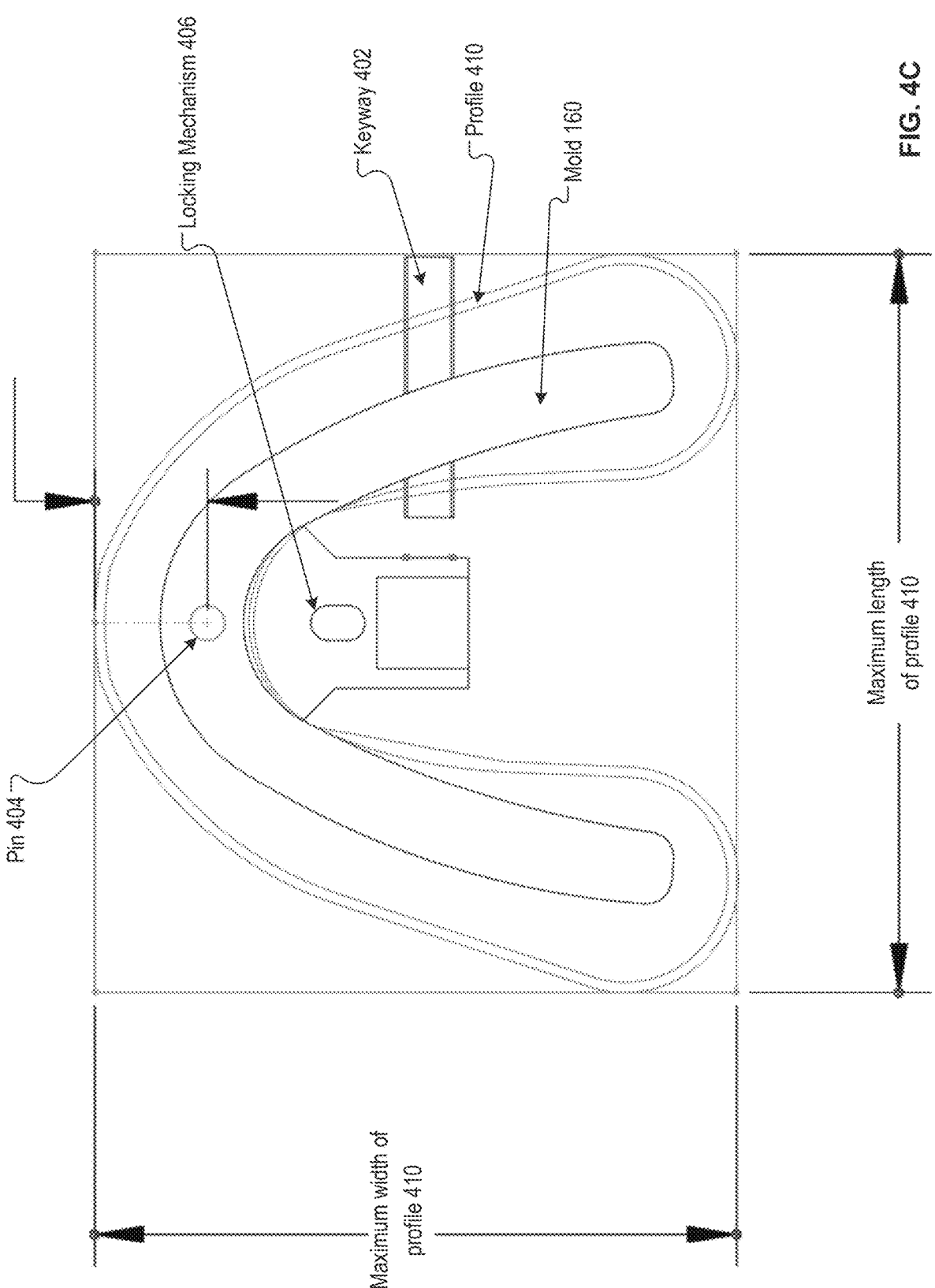
FIG. 4C illustrates a profile of a mold, according to certain embodiments.

FIG. 4C illustrates the profile 410 of a mold 160, according to certain embodiments. In some embodiments, two or more molds 160 that fit within the size of the profile 410 may used on the same plate 162 to simultaneously thermoform multiple aligners. In some embodiments, molds 160 that do not fit within the dimensions of the profile 410 are to be used to thermoform one aligner at a time. A maximum profile 410 of each mold may have a maximum length (e.g., 72 mm) and a maximum width (e.g., 62.5 mm) in one embodiment.

Returning to FIG. 4B, the sheet of plastic 154 may have a first length (e.g., 148 mm) that is about twice the maximum length (e.g., 72 mm) of the profile 410 and the sheet of plastic may have a first width (e.g., 90 mm) that is about 1.4 times the maximum width (e.g., 62.5 mm) of the profile 410.

A distance from an inner wall 420 of the thermoforming chamber 130 that surrounds the molds 160 to a perimeter edge of the sheet of plastic 154 may be at least 1.8% of the first length of the sheet of plastic 154 or at least 3.1% of the first width of the sheet of plastic 154 to avoid air leakage during thermoforming via the thermoforming chamber 130. For example, the distance from the inner wall 420 of the thermoforming chamber 130 to the perimeter of the sheet of plastic 154 may be about 2.75 mm. The portion of the sheet of plastic 154 corresponding to the distance from the inner wall 420 of the thermoforming chamber 130 to the perimeter edge of the sheet of plastic 154 may be used to hold the sheet of plastic 154 in place while being processed (e.g., heated, thermoformed, etc.). This distance may allow the sheet of plastic 154 to be held in place correctly so that the sheet of plastic 154 does not hang during heating (e.g., hanging may cause an air leak when forming).

A minimum distance from an inner wall 420 of the thermoforming chamber 130 to the maximum profile 410 (e.g., projection tangent) may be about 4.2-4.5% the first length of the sheet of plastic 154 or about 7-7.2% of the first width of the sheet of plastic 154. For example, the distance from the inner wall 420 of the thermoforming chamber 130 to the perimeter of the sheet of plastic 154 may be about 6.34-6.82 mm (e.g., about 6.55 mm from the first edge of the sheet of plastic that has the first length and about 6.34 mm from the second edge of the sheet that has the first width). The minimum distance between the inner walls 420 of the thermoforming chamber 130 and the profile 410 may be used to generate (e.g., via thermoforming) aligners with a threshold thickness (e.g., to provide the force necessary to move teeth). The minimum distance may be used to define the position and orientation of the features (e.g., keyway 402, pin 404, locking mechanism 406, etc.) of the plate 162 where the mold 160 is fixed while being processed.

Each mold 160A-B may be at about a 25 degree (°) to a 40° angle from a first edge of the sheet of plastic 154 that has the first length. For example, each mold may be at about a 32° angle from a first edge of the sheet of plastic 154 that has the first length.

A distance between a first line 412A tangent to molar sections of the maximum profile 410A corresponding to the first mold 160A and a second line 412B tangent to molar sections of the maximum profile 410B corresponding to the second mold 160B may be about 3-4% of the first length of the sheet of plastic 154 or 5-6% of the first width of the sheet of plastic 154 to avoid forming defects. For example, the distance between the first line tangent 412A to molar sections of the profile 410A and the second line tangent 412B to the molar sections of the profile 410B may be about 5 mm.

A distance between a first molar section of a first maximum profile 410A and a second molar section of a second maximum profile 410B may be about 9-10% of the first length of the sheet of plastic 154 or 16-17% of the first width of the sheet of plastic 154 to avoid forming defects. For example, the distance between the first molar section and the second molar section may be about 13.59-14.56 mm. The distance between the molar sections (e.g., separation between molar sections of the molds 160) of the profiles 410 may prevent forming defects such as webbing (e.g., thermoformed sheet of plastic 154 creating a bridge from one mold 160 to another mold 160) and thickness defects (e.g., non-uniform thickness, overly thin thickness, overly thick thickness, etc.).

The sheet of plastic 154 may be sized to fit only the first mold 160A and the second mold 160B. For example, the sheet of plastic 154 may be sized to fit two molds without having space for a third mold. The sheet of plastic 154 may be sized to fit the first and second molds 160A-B with only the distances between the molds 160, distances between the molds 160 and inner wall 420 of the thermoforming chamber 130, and distances between the outer perimeter of the sheet of plastic 154 and the inner walls 420 of the thermoforming chamber 130 as described herein. Sized to fit may refer to fitting two profiles 410 with one or more of the following distances as described herein: distance from an inner wall 420 of the thermoforming chamber 130 that surrounds the molds 160 to a perimeter edge of the sheet of plastic 154; minimum distance from an inner wall 420 of the thermoforming chamber 130 to the maximum profile 410; each of mold 160 may be at about a 25° to a 40° angle from a first edge of the sheet of plastic 154 that has the first length; distance between a first line tangent 412A to molar sections of the profile 410A corresponding to the first mold 160A and a second line 412B tangent to molar sections of the profile 410B corresponding to the second mold 160B; and/or a distance between a first molar section of a first maximum profile 410A and a second molar section of a second maximum profile 410B.

Figure 5A:
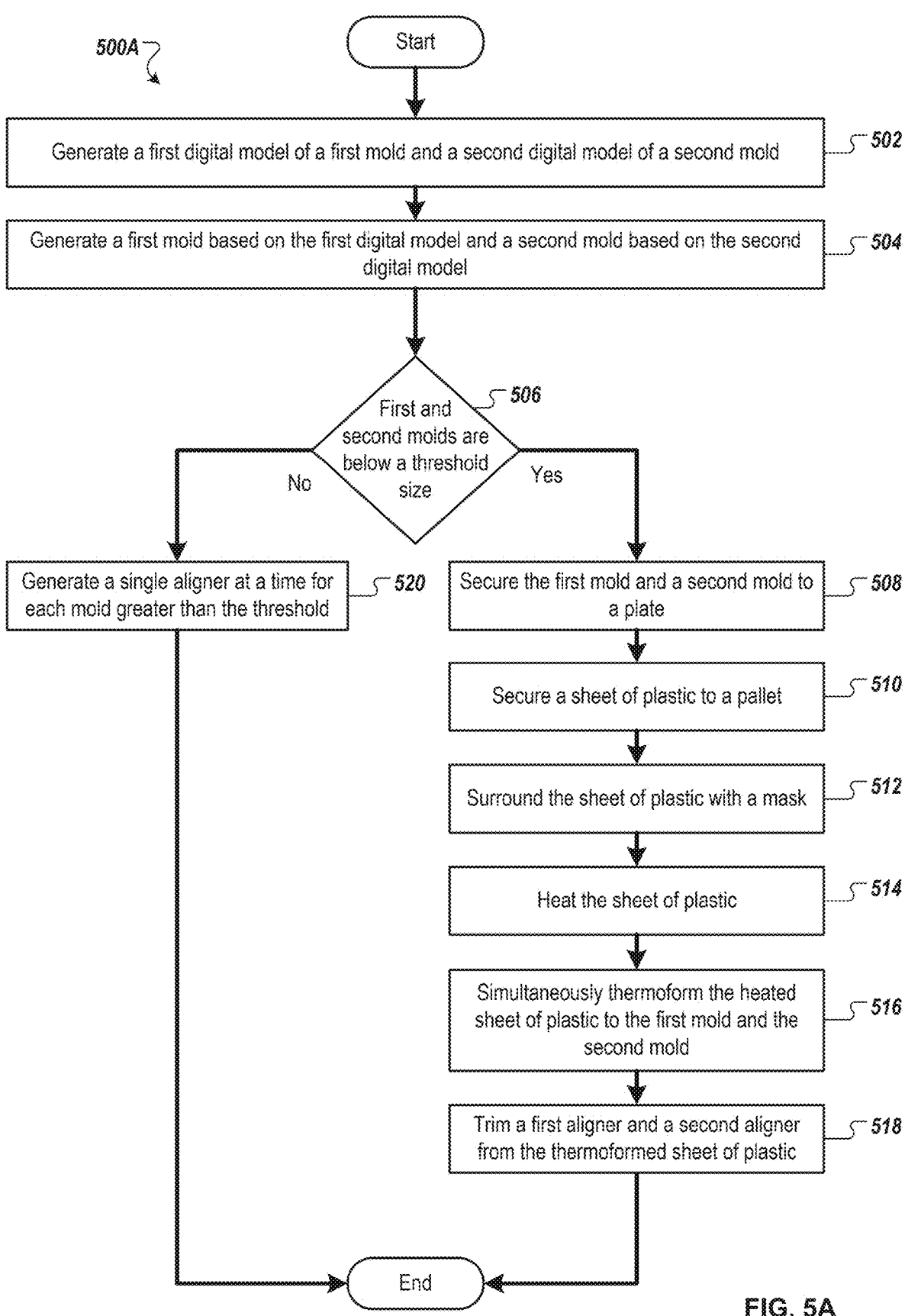

FIGS. 5A-B illustrate flow diagrams for method 500A-B of thermoforming multiple aligners simultaneously (or otherwise in parallel), according to certain embodiments. In some embodiments, one or more operations of methods 500A-B are performed by a processing logic of a computing device to automate one or more operations of forming an aligner. The processing logic may include hardware (e.g., circuitry, dedicated logic, programmable logic, microcode, etc.), software (e.g., instructions executed by a processing device), firmware, or a combination thereof. For example, one or more operations of methods 500A-B may be performed by a processing device executing a program or module, such as aligner generator 650 of FIG. 6.

Referring to FIG. 5A, at block 502 of method 500A, a corresponding digital model for each mold is generated. For example, a first digital model of a first mold and a second digital model of a second mold may be generated. A shape of a dental arch for a patient at a treatment stage may be determined based on a treatment plan to generate the digital model of the mold. In the example of orthodontics, the treatment plan may be generated based on an intraoral scan of a dental arch to be modeled. The intraoral scan of a patient's dental arch may be performed to generate a three dimensional (3D) virtual model of the patient's dental arch. For example, a full scan of the mandibular and/or maxillary arches of a patient may be performed to generate 3D virtual models thereof. The intraoral scan may be performed by creating multiple overlapping intraoral images from different scanning stations and then stitching together the intraoral images to provide a composite 3D virtual model. In other applications, virtual 3D models may also be generated based on scans of an object to be modeled or based on use of computer aided drafting techniques (e.g., to design the virtual 3D mold). Alternatively, an initial negative mold may be generated from an actual object to be modeled. The negative mold may then be scanned to determine a shape of a positive mold that will be produced.

Once the virtual 3D model of the patient's dental arch is generated, a dental practitioner may determine a desired treatment outcome, which includes final positions and orientations for the patient's teeth. Processing logic may then determine a number of treatment stages to cause the teeth to progress from starting positions and orientations to the target final positions and orientations. The shape of the final virtual 3D model and each intermediate virtual 3D model may be determined by computing the progression of tooth movement throughout orthodontic treatment from initial tooth placement and orientation to final corrected tooth placement and orientation. For each treatment stage, a separate virtual 3D model of the patient's dental arch at that treatment stage may be generated. The shape of each virtual 3D model will be different. The original virtual 3D model, the final virtual 3D model and each intermediate virtual 3D model is unique and customized to the patient.

The processing logic may determine an initial shape for a mold of the patient's dental arch at a treatment stage based on the digital model of the dental arch at that treatment stage. Processing logic may additionally determine one or more features to add to the mold that will cause the aligner formed over the mold to have the determined markings and/or elements.

The processing logic may determine a final shape for the mold and may generate a digital model of the mold. Alternatively, the digital model may have already been generated. In such an instance, processing logic updates the already generated digital model to include the determined features for the mold. The digital model may be represented in a file such as a computer aided drafting (CAD) file or a 3D printable file such as a stereolithography (STL) file. The digital model may include instructions that will control a fabrication system or device in order to produce the mold with specified geometries.

At block 504, a corresponding mold is generated based on each digital model. For example, a first mold may be generated for a first digital model and a second mold may be generated for a second digital model. Each virtual 3D model of a patient's dental arch may be used to generate a unique customized mold of the dental arch at a particular stage of treatment. The shape of the mold may be at least in part based on the shape of the virtual 3D model for that treatment stage. The mold may correspond to a dental arch of a patient and the mold may include a sloping portion that commences below a gum line of the dental arch and extends away from the dental arch to a lower portion of the mold. A portion of the thermoformed sheet of plastic 154 that is disposed on the sloping portion of the mold is to be trimmed (e.g., at block 518 to trim the aligners from the thermoformed sheet of plastic). In some embodiments, at block 504, the mold is generated with the sloping portion commencing below the gum line to assist in the release of the thermoformed sheet of plastic from the mold. The mold may be formed using a rapid prototyping equipment (e.g., 3D printers) to manufacture the mold using additive manufacturing techniques (e.g., stereolithography) or subtractive manufacturing techniques (e.g., milling). The digital model may be input into a rapid prototyping machine. The rapid prototyping machine then manufactures the mold using the digital model. One example of a rapid prototyping manufacturing machine is a 3D printer. 3D Printing includes any layer-based additive manufacturing processes. 3D printing may be achieved using an additive process, where successive layers of material are formed in proscribed shapes. 3D printing may be performed using extrusion deposition, granular materials binding, lamination, photopolymerization, continuous liquid interface production (CLIP), or other techniques. 3D printing may also be achieved using a subtractive process, such as milling.

In one embodiment, stereolithography (SLA), also known as optical fabrication solid imaging, is used to fabricate an SLA mold. In SLA, the mold is fabricated by successively printing thin layers of a photo-curable material (e.g., a polymeric resin) on top of one another. A platform rests in a bath of a liquid photopolymer or resin just below a surface of the bath. A light source (e.g., an ultraviolet laser) traces a pattern over the platform, curing the photopolymer where the light source is directed, to form a first layer of the mold. The platform is lowered incrementally, and the light source traces a new pattern over the platform to form another layer of the mold at each increment. This process repeats until the mold is completely fabricated. Once all of the layers of the mold are formed, the mold may be cleaned and cured.

Materials such as a polyester, a co-polyester, a polycarbonate, a polycarbonate, a thermoplastic polyurethane, a polypropylene, a polyethylene, a polypropylene and polyethylene copolymer, an acrylic, a cyclic block copolymer, a polyetheretherketone, a polyamide, a polyethylene terephthalate, a polybutylene terephthalate, a polyetherimide, a polyethersulfone, a polytrimethylene terephthalate, a styrenic block copolymer (SBC), a silicone rubber, an elastomeric alloy, a thermoplastic elastomer (TPE), a thermoplastic vulcanizate (TPV) elastomer, a polyurethane elastomer, a block copolymer elastomer, a polyolefin blend elastomer, a thermoplastic co-polyester elastomer, a thermoplastic polyamide elastomer, or combinations thereof, may be used to directly form the mold. The materials used for fabrication of the mold can be provided in an uncured form (e.g., as a liquid, resin, powder, etc.) and can be cured (e.g., by photopolymerization, light curing, gas curing, laser curing, crosslinking, etc.). The properties of the material before curing may differ from the properties of the material after curing.

Optionally, the rapid prototyping techniques described herein allow for fabrication of a mold including multiple materials, referred to herein as "multi-material direct fabrication." In some embodiments, a multi-material direct fabrication method involves concurrently forming an object from multiple materials in a single manufacturing step. For instance, a multi-tip extrusion apparatus can be used to selectively dispense multiple types of materials (e.g., resins, liquid, solids, or combinations thereof) from distinct material supply sources in order to fabricate an object from a plurality of different materials. Alternatively or in combination, a multi-material direct fabrication method can involve forming an object from multiple materials in a plurality of sequential manufacturing steps. For instance, a first portion of the object (e.g., a main portion of the mold) can be formed from a first material in accordance with any of the direct fabrication methods herein, then a second portion of the object (e.g., complex features added to the mold) can be formed from a second material in accordance with methods herein, and so on, until the entirety of the object has been formed. The relative arrangement of the first and second portions can be varied as desired. In one embodiment, multi-material direct fabrication is used to cause a first material to be used for the markings of the cut line on the mold, and to cause one or more additional materials to be used for the remainder of the mold.

Aligners may be formed from each mold to provide forces to move the patient's teeth. The shape of each aligner is unique and customized for a particular patient and a particular treatment stage. In an example, the aligners can be pressure formed or thermoformed over the molds. Each mold may be used to fabricate an aligner that will apply forces to the patient's teeth at a particular stage of the orthodontic treatment. The aligners each have teeth-receiving cavities that receive and resiliently reposition the teeth in accordance with a particular treatment stage.

At block 506, whether a first mold and a second mold are below a threshold size (e.g., maximum profile 410 of FIGS. 4B-C) is determined. Responsive to determining a size of a mold is below the threshold size, flow continues to block 508 (e.g., the corresponding aligner may be thermoformed simultaneously (or in parallel) with another aligner). Responsive to determining the size of a mold is above the threshold size, flow continues to block 520 where a single aligner at a time is generated for each mold greater than the threshold size (e.g., instead of simultaneously thermoforming the aligner with another aligner, at a standard thermoforming apparatus).

At block 508, the first mold and the second mold are secured to a plate (see FIGS. 4A-B). The first and second molds may be secured to the plate via fasteners such as a pin, a keyway, and a locking mechanism. The first and second molds may be secured to the plate to avoid movement in the x-, y-, and z-direction and to avoid rotation (e.g., change in angle) of the molds.

At block 510, a sheet of plastic is secured to a pallet (see FIGS. 1 and 2A-C). The sheet of plastic may be an elastic thermoplastic, a sheet of polymeric material, etc. The sheet of plastic may be lowered onto the pallet so that holding pins of the pallet pierce the sheet of plastic to secure the sheet of plastic to the pallet.

At block 512, the sheet of plastic secured to the pallet is surrounded by a mask (see FIGS. 1 and 2A-C). A pressurized cylinder may lower the mask onto the sheet of plastic secured to the pallet.

At block 514, the sheet of plastic is heated. The sheet of plastic may be heated to a temperature at which the sheet of plastic becomes pliable. The sheet of plastic may be heated using a ceramic heater, convection oven, or infrared heater. The mask may allow the sheet of plastic to be heated to 336° F. without hanging to avoid air leaks.

At block 516, the heated sheet of plastic is simultaneously thermoformed to the first mold and the second mold that are secured to the plate. To thermoform the heated sheet of plastic over the two molds, pressure may concurrently be applied to the sheet of plastic to form the now pliable sheet of plastic around the two molds (e.g., with features that will imprint markings and/or elements in the aligners formed on the molds). Once the sheet cools, it will have a shape that conforms to both molds. In one embodiment, a release agent (e.g., a non-stick material) is applied to the molds before forming the aligners (e.g., shells). This may facilitate later removal of the molds from the shells. In some embodiments, the sheet of plastic is pressure formed over the first mold and the second mold simultaneously.

At block 518, a first aligner and a second aligner are trimmed from the thermoformed sheet of plastic. The thermoformed sheet of plastic may be removed from the molds (e.g., using a shell removal device). The thermoformed sheet of plastic may be trimmed to generate the first and second aligners. In some embodiments, for each mold, the portion of thermoformed sheet of plastic that is disposed on a portion of the corresponding mold that slopes outward below the gum line is removed during the trimming of the thermoformed sheet of plastic to generate the aligners. After the thermoformed sheet of plastic is removed from the mold for a treatment stage, the thermoformed sheet of plastic is subsequently trimmed along one or more cut lines (also referred to as a trim line). The cut line may be a gingival cut line that represents an interface between an aligner and a patient's gingiva. In one embodiment, the aligner is manually cut by a technician using scissors, a bur, a cutting wheel, a scalpel, or any other cutting implement. In another embodiment, the aligner is cut by a computer controlled trimming machine such as a CNC machine or a laser trimming machine. The computer controlled trimming machine may control an angle and position of a cutting tool of the trimming machine to trim the thermoformed sheet of plastic. In some embodiments, the thermoformed sheet of plastic is divided into two parts (each part corresponding to a respective aligner) prior to the trimming of thermoformed sheet of plastic to generate the aligners.

Referring to FIG. 5B, at block 540 of method 500B, a first size of a first mold of a first dental arch and a second size of a second mold of a second dental arch are determined. In some embodiments, the first and second sizes may be determined based on digital models of the first mold and the second mold. In some embodiments, the first and second sizes may be determined by measuring the first mold and the second mold (e.g., via automated optical measurement, manually, etc.). In some embodiments, the sizes of the molds are compared to threshold sizes.

At block 542, a first plate, a first sheet of plastic, and a first pallet are selected based on at least one of the first size or the second size. In some embodiments, if the larger of the first mold and the second mold meets a first threshold size, a first size of plate, sheet of plastic, and/or pallet are selected. If the larger of the first mold and the second mold meets a different threshold size, a second size of plate, sheet of plastic, and/or pallet are selected. In some embodiments, if the first mold and the second mold in combination meet a first threshold size, a first size of plate, sheet of plastic, and/or pallet are selected. In some embodiments, multiple (e.g., three, such as small, medium, and larger) sizes of plate, sheet of plastic, and/or pallet are available from which to select. Selecting a correctly sized plate, sheet of plastic, and/or pallet can minimize the amount of plastic discarded and the amount of defective aligners.

At block 544, the first mold and the second mold are secured to the first plate. Block 544 is similar to block 508 of method 500A of FIG. 5A. The first sheet of plastic is secured to the first pallet and the first pallet securing the first sheet of plastic is transferred to a heating station.

At block 546, the first sheet of plastic is heated (e.g., at a heating station) to generate a first heated sheet. Block 546 is similar to block 514 of method 500A of FIG. 5A. A mask may be placed on the first sheet of plastic to minimize heat transfer from the heater to other sheets of plastic. The first heated sheet may be transferred to a thermoforming station.

At block 548, the first heated sheet is simultaneously thermoformed (e.g., at a thermoforming station) over the first mold of the first dental arch and the second mold of the second dental arch to form a first aligner and a second aligner. To unload the thermoformed sheet from the pallet and form the aligners, the thermoformed sheet may be transferred to an unloading station. Block 548 is similar to blocks 516-518 of method 500A of FIG. 5A.

In some embodiments, the transferring of the first plate securing the first sheet of plastic is via a conveyor system (e.g., via lateral movement, via conveyor system 140 of FIG. 1A). In some embodiments, the transferring of the first plate securing the first sheet of plastic is via a dial system (e.g., via rotational movement, via dial system 190A of FIG. 1B).

In some embodiments, the first mold and the second mold are transferred to be located below the thermoforming station and are lifted to have the heated sheet thermoformed over the first mold and the second mold. In some embodiments, the transferring of the first mold and the second mold to be located below the thermoforming station is via lateral movement. In some embodiments, the transferring of the first mold and the second mold to be located below the thermoforming station is via rotational movement (e.g., via dial system 190A of FIG. 1B).

Figure 6:
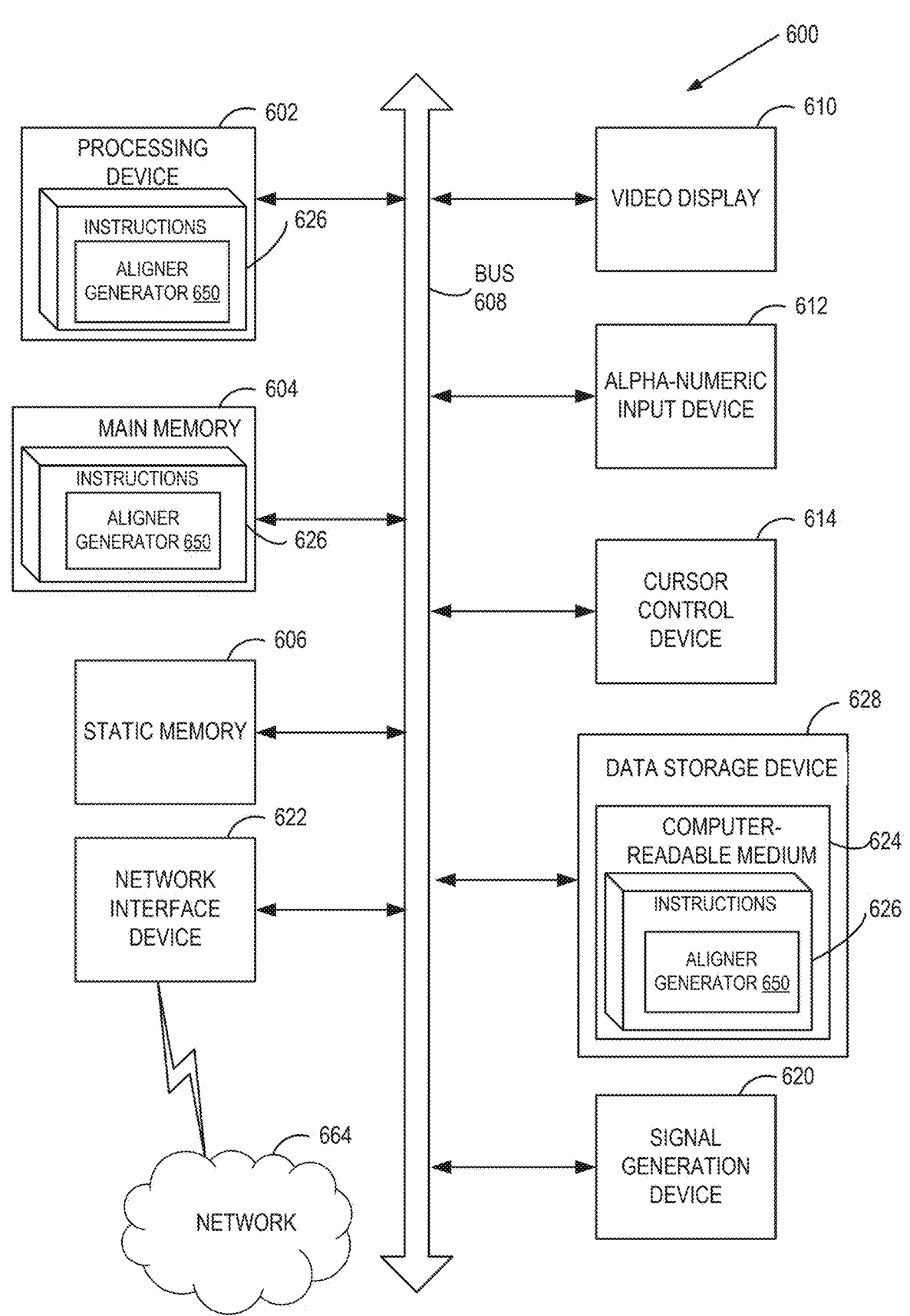
FIG. 6 illustrates a block diagram of an example computing device, according to certain embodiments.

FIG. 6 illustrates a diagrammatic representation of a machine in the example form of a computing device 600 within which a set of instructions, for causing the machine to perform any one or more of the methodologies discussed with reference to the method of FIG. 5. In alternative embodiments, the machine may be connected (e.g., networked) to other machines in a Local Area Network (LAN), an intranet, an extranet, or the Internet. For example, the machine may be networked to a rapid prototyping apparatus such as a 3D printer or SLA apparatus. The machine may operate in the capacity of a server or a client machine in a client-server network environment, or as a peer machine in a peer-to-peer (or distributed) network environment. The machine may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The example computing device 600 includes a processing device 602, a main memory 604 (e.g., read-only memory (ROM), flash memory, dynamic random access memory (DRAM) such as synchronous DRAM (SDRAM), etc.), a static memory 606 (e.g., flash memory, static random access memory (SRAM), etc.), and a secondary memory (e.g., a data storage device 628), which communicate with each other via a bus 608.

Processing device 602 represents one or more general-purpose processors such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. Processing device 602 is configured to execute the processing logic (instructions 626) for performing operations and steps discussed herein.

The computing device 600 may further include a network interface device 622 for communicating with a network 664. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The data storage device 628 may include a machine-readable storage medium (or more specifically a non-transitory computer-readable storage medium) 624 on which is stored one or more sets of instructions 626 embodying any one or more of the methodologies or functions described herein. A non-transitory storage medium refers to a storage medium other than a carrier wave. The instructions 626 may also reside, completely or at least partially, within the main memory 604 and/or within the processing device 602 during execution thereof by the computing device 600, the main memory 604 and the processing device 602 also constituting computer-readable storage media.

The computer-readable storage medium 624 may also be used to store one or more instructions for aligner production and/or an aligner generator 650, which may perform one or more of the operations of methods 500A-B described with reference to FIGS. 5A-B. The computer-readable storage medium 624 may also store a software library containing methods that call an aligner generator 650. While the computer-readable storage medium 624 is shown in an example embodiment to be a single medium, the term "non-transitory computer-readable storage medium" should be taken to include a single medium or multiple media (e.g., a centralized or distributed database, and/or associated caches and servers) that store the one or more sets of instructions. The term "non-transitory computer-readable storage medium" shall also be taken to include any medium that is capable of storing or encoding a set of instructions for execution by the machine and that cause the machine to perform any one or more of the methodologies of the present disclosure. The term "non-transitory computer-readable storage medium" shall accordingly be taken to include, but not be limited to, solid-state memories, and optical and magnetic media.

Figure 7A:
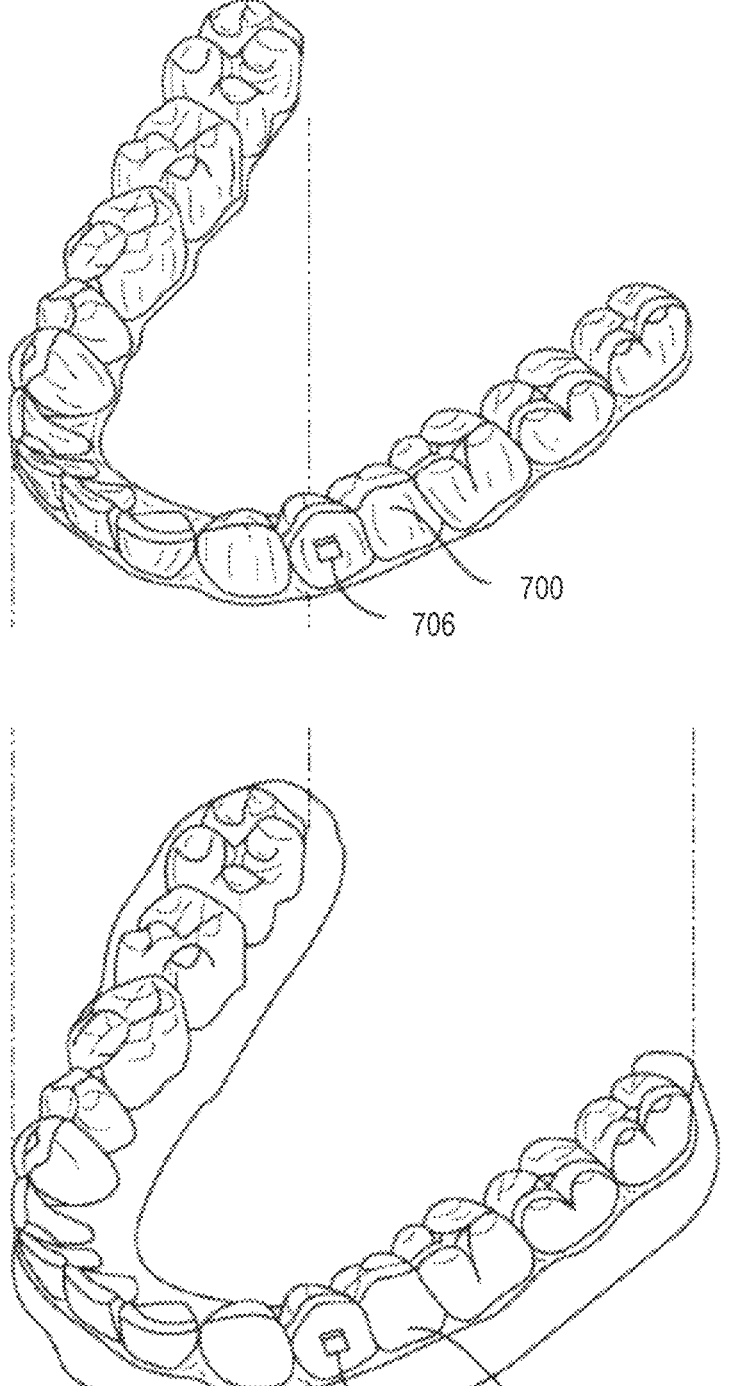
FIG. 7A illustrates a tooth repositioning appliance, according to certain embodiments.

FIG. 7A illustrates an exemplary tooth repositioning appliance or aligner 700 that can be worn by a patient in order to achieve an incremental repositioning of individual teeth 702 in the jaw. The aligner 700 may be trimmed from a thermoformed sheet of plastic 154 (e.g., of FIG. 1A or FIG. 1B) that was formed by simultaneous thermoforming of multiple aligners, as described herein. The appliance can include a shell (e.g., a continuous polymeric shell or a segmented shell) having teeth-receiving cavities that receive and resiliently reposition the teeth. An appliance or portion(s) thereof may be indirectly fabricated using a physical model of teeth. For example, an appliance (e.g., polymeric appliance) can be formed using a physical model of teeth and a sheet of suitable layers of polymeric material. A "polymeric material," as used herein, may include any material formed from a polymer. A "polymer," as used herein, may refer to a molecule composed of repeating structural units connected by covalent chemical bonds often characterized by a substantial number of repeating units (e.g., equal to or greater than 3 repeating units, optionally, in some embodiments equal to or greater than 10 repeating units, in some embodiments greater or equal to 30 repeating units) and a high molecular weight (e.g. greater than or equal to 10,000 Da, in some embodiments greater than or equal to 50,000 Da or greater than or equal to 100,000 Da). Polymers are commonly the polymerization product of one or more monomer precursors. The term polymer includes homopolymers, or polymers consisting essentially of a single repeating monomer subunit. The term polymer also includes copolymers which are formed when two or more different types of monomers are linked in the same polymer. Useful polymers include organic polymers or inorganic polymers that may be in amorphous, semi-amorphous, crystalline or semi-crystalline states. Polymers may include polyolefins, polyesters, polyacrylates, polymethacrylates, polystyrenes, Polypropylenes, polyethylenes, Polyethylene terephthalates, poly lactic acid, polyurethanes, epoxide polymers, polyethers, poly(vinyl chlorides), polysiloxanes, polycarbonates, polyamides, poly acrylonitriles, polybutadienes, poly(cycloolefins), and copolymers. The systems and/or methods provided herein are compatible with a range of plastics and/or polymers. Accordingly, this list is not all inclusive, but rather is exemplary. The plastics can be thermosets or thermoplastics. The plastic may be a thermoplastic.

Examples of materials applicable to the embodiments disclosed herein include, but are not limited to, those materials described in the following patent applications filed by Align Technology: "MULTILAYER DENTAL APPLIANCES AND RELATED METHODS AND SYSTEMS," U.S. Pat. No. 9,655,691 to Li, et al., filed May 14, 2012; "SYSTEMS AND METHODS FOR VARYING ELASTIC MODULUS APPLIANCES," U.S. Pat. No. 6,964,564 to Phan, et al., filed Jul. 26, 2002; "METHODS OF MAKING ORTHODONTIC APPLIANCES," U.S. Pat. No. 7,641,828 to DeSimone, et al., filed Oct. 12, 2004; "TREATMENT OF TEETH BY ALIGNERS," U.S. Pat. No. 8,740,614 to Wen et al., filed Jul. 29, 2009; and any applications claiming benefit therefrom or providing benefit thereto (including publications and issued patents), including any divisional, continuation, or continuation-in-part thereof, the content of which are incorporated by reference herein.

Examples of materials applicable to the embodiments disclosed herein include a hard polymer layer disposed between two soft polymer layers. In some embodiments, the hard inner polymer layer includes a co-polyester and has a polymer layer elastic modulus. In some embodiments, a first soft outer polymer layer and a second soft outer polymer layer each include a thermoplastic polyurethane elastomer and each have a soft polymer elastic modulus less than the hard polymer layer elastic modulus, a flexural modulus of greater than about 35,000 psi, a hardness of about 60 A to about 85 D, and a thickness in a range from 25 microns to 100 microns. In some embodiments, the hard inner polymer layer is disposed between the first soft outer polymer layer and the second soft outer polymer layer so as to reduce degradation of the resilient position force applied to the teeth when the appliance is worn. The hard polymer layer can include a polyester, a co-polyester, a polycarbonate, a thermoplastic polyurethane, a polypropylene, a polyethylene, a polypropylene and polyethylene copolymer, an acrylic, a cyclic block copolymer, a polyetheretherketone, a polyamide, a polyethylene terephthalate, a polybutylene terephthalate, a polyetherimide, a polyethersulfone, a polytrimethylene terephthalate or a combination thereof (e.g., a blend of at least two of the listed hard polymeric materials). In some embodiments, the hard polymer layer includes two or more hard polymer layers. The soft outer polymer material may include a styrenic block copolymer (SBC), a silicone rubber, an elastomeric alloy, a thermoplastic elastomer (TPE), a thermoplastic vulcanizate (TPV) elastomer, a polyurethane elastomer, a block copolymer elastomer, a polyolefin blend elastomer, a thermoplastic co-polyester elastomer, a thermoplastic polyamide elastomer, or a combination thereof (e.g., a blend of at least two of the listed soft polymeric materials). The soft polymer layers can be the same material or a different material.

Examples of materials applicable to the embodiments disclosed herein include a middle layer disposed between two layers. The two layers individually include a thermoplastic polymer having a flexural modulus of from about 1,000 MPa to 2,500 MPa and a glass transition temperature and/or melting point of from about 80° C. to 180° C. The middle layer includes a polyurethane elastomer having a flexural modulus of from about 50 MPa to about 500 MPa and one or more of a glass transition temperature and/or melting point of from about 90° C. to about 220° C. The polymeric sheet composition has a combined thickness of the middle layer and the outer layers of from 250 microns to 2000 microns and a flexural modulus of from 500 MPa to 1,500 MPa. In some embodiments, the outer layers include one or more of a co-polyester, a polycarbonate, a polyester polycarbonate blend, a polyurethane, a polyamide, or a polyolefin. The middle layer may have a Shore hardness of from A90 to D55 and a compression set of less than 35% after 22 hours at 25° C. In some embodiments, the outer layers have a lateral restoring force of less than 100 Newtons (N) per square centimeter when displayed by 0.05 mm to 0.1 mm relative to each other. In some embodiments, the interplay peel strength between the outer layers and the middle layer is greater than 50 N per 2.5 cm. In some embodiments, the combined thickness of the outer layers is from 50 microns to 1,000 microns. In some embodiments one or more of the outer layers include a microcrystalline polyamide including of from 50 to 100 mole % of C6 to C14 aliphatic diacid moieties and about 50 to 100 mole % of 4,4'-methylene-bis(cyclohexylamine), having a glass transition of between about 100° C. and 180° C., a heat of fusion of less than 20 J/g and a light transmission of greater than 80%. In some embodiments, one or more of the outer layers includes a co-polyester including: a dicarboxylic acid component including 70 mole % to 100 mole % of terephthalic acid residues; and a diol component including (i) 0 to 90 mole % ethylene glycol, (ii) 5 mole % to 50 mole % of 2,2,4,4-tetramethyl-1,3-cyclobutanediol residues, (iii) 50 mole % to 95 mole % 1,4-cyclohexanedimethanol residues, and (iv) 0 to 1 mole % of a polyol having three or more hydroxyl groups, where the sum of the mole % of diol residues (i), (ii), (iii), and (iv) amounts to 100 mole % and the co-polyester exhibits a glass transition temperature Tg from 80° C. to 150° C. In some embodiments, the middle layer includes an aromatic polyether polyurethane having a Shore hardness of from A90 to D55 and a compression set of less than 35%, where the interlayer peel strength between the outer layers and the middle layer is greater than 50 N per 2.5 cm. In some embodiments, one or more of the outer layers includes a polyurethane that includes: a di-isocyanate including 80 mole % to 100 mole % of methylene diphenyl diisocyanate residues and/or hydrogenated methylene diphe-nyl diisocyanate; and a diol component including: (i) 0 to 100 mole % hexamethylene diol; and (ii) 0 to 50 mole % 1,4-cyclohexanedimethanol, where the sum of (i) and (ii) amounts to greater than 90 mole % and the polyurethane has a glass transition temperature Tg from about 85° C. to about 150° C.

Although polymeric aligners are discussed herein, the techniques disclosed may also be applied to aligners having different materials. Some embodiments are discussed herein with reference to orthodontic aligners (also referred to simply as aligners). However, embodiments also extend to other types of shells formed over molds, such as orthodontic retainers, orthodontic splints, sleep appliances for mouth insertion (e.g., for minimizing snoring, sleep apnea, etc.) and/or shells for non-dental applications. Accordingly, it should be understood that embodiments herein that refer to aligners also apply to other types of shells. For example, the principles, features and methods discussed may be applied to any application or process in which it is useful to perform simultaneous forming multiple shells which are any suitable type of shells that are form fitting devices such as eye glass frames, contact or glass lenses, hearing aids or plugs, artificial knee caps, prosthetic limbs and devices, orthopedic inserts, as well as protective equipment such as knee guards, athletic cups, or elbow, chin, and shin guards and other like athletic/protective devices.

The aligner 700 can fit over all teeth present in an upper or lower jaw, or less than all of the teeth. The appliance can be designed specifically to accommodate the teeth of the patient (e.g., the topography of the tooth-receiving cavities matches the topography of the patient's teeth), and may be fabricated based on positive or negative models of the patient's teeth generated by impression, scanning, and the like. Alternatively, the appliance can be a generic appliance configured to receive the teeth, but not necessarily shaped to match the topography of the patient's teeth. In some cases, only certain teeth received by an appliance will be reposi-tioned by the appliance while other teeth can provide a base or anchor region for holding the appliance in place as it applies force against the tooth or teeth targeted for reposi-tioning. In some cases, some, most, or even all of the teeth will be repositioned at some point during treatment. Teeth that are moved can also serve as a base or anchor for holding the appliance as it is worn by the patient. Typically, no wires or other means will be provided for holding an appliance in place over the teeth. In some cases, however, it may be desirable or necessary to provide individual attachments or other anchoring elements 704 on teeth 702 with correspond-ing receptacles or apertures 706 in the appliance 700 so that the appliance can apply a selected force on the tooth. Exemplary appliances, including those utilized in the Invis-align® System, are described in numerous patents and patent applications assigned to Align Technology, Inc. including, for example, in U.S. Pat. Nos. 6,450,807, and 5,975,893, as well as on the company's website, which is accessible on the World Wide Web (see, e.g., the url "invis-align.com"). Examples of tooth-mounted attachments suit-able for use with orthodontic appliances are also described in patents and patent applications assigned to Align Tech-nology, Inc., including, for example, U.S. Pat. Nos. 6,309, 215 and 6,830,450.

Figure 7B:
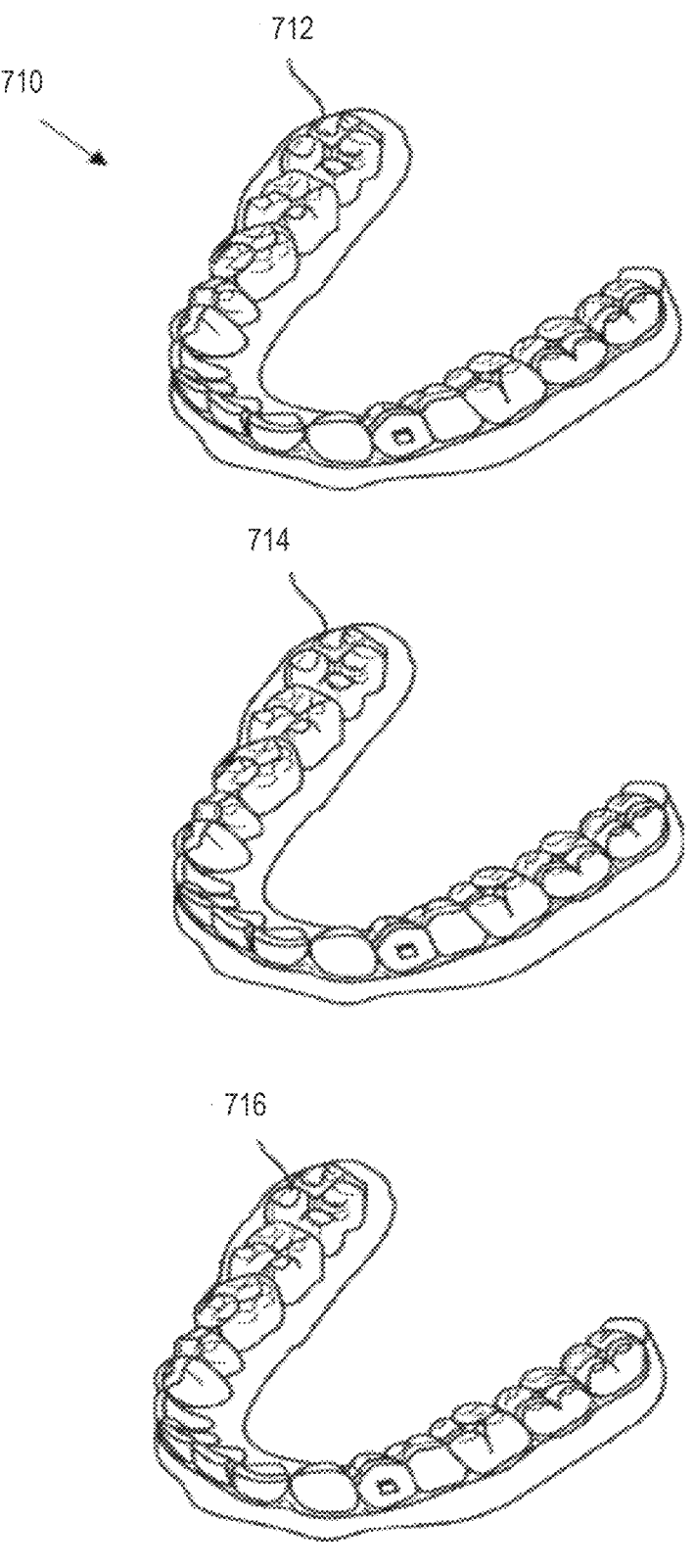
FIG. 7B illustrates a tooth repositioning system, according to certain embodiments.

FIG. 7B illustrates a tooth repositioning system 710 including a plurality of appliances 712, 714, 716. The appliances 712, 714, 716 may be trimmed from a thermo-formed sheet of plastic that was formed via simultaneous thermoforming of multiple aligners, as described herein. Any of the appliances described herein can be designed and/or provided as part of a set of a plurality of appliances used in a tooth repositioning system. Each appliance may be configured so a tooth-receiving cavity has a geometry cor-responding to an intermediate or final tooth arrangement intended for the appliance. The patient's teeth can be pro-gressively repositioned from an initial tooth arrangement to a target tooth arrangement by placing a series of incremental position adjustment appliances over the patient's teeth. For example, the tooth repositioning system 710 can include a first appliance 712 corresponding to an initial tooth arrange-ment, one or more intermediate appliances 714 correspond-ing to one or more intermediate arrangements, and a final appliance 716 corresponding to a target arrangement. A target tooth arrangement can be a planned final tooth arrangement selected for the patient's teeth at the end of all planned orthodontic treatment. Alternatively, a target arrangement can be one of some intermediate arrangements for the patient's teeth during the course of orthodontic treatment, which may include various different treatment scenarios, including, but not limited to, instances where surgery is recommended, where interproximal reduction (IPR) is appropriate, where a progress check is scheduled, where anchor placement is best, where palatal expansion is desirable, where restorative dentistry is involved (e.g., inlays, onlays, crowns, bridges, implants, veneers, and the like), etc. As such, it is understood that a target tooth arrangement can be any planned resulting arrangement for the patient's teeth that follows one or more incremental repositioning stages. Likewise, an initial tooth arrangement can be any initial arrangement for the patient's teeth that is followed by one or more incremental repositioning stages.

In some embodiments, the appliances 712, 714, 716 (or portions thereof) can be produced using indirect fabrication techniques, such as by thermoforming over a positive or negative mold. Indirect fabrication of an orthodontic appli-ance can involve producing a positive or negative mold of the patient's dentition in a target arrangement (e.g., by rapid prototyping, milling, etc.) and thermoforming one or more sheets of material over the mold in order to generate an appliance shell.

In an example of indirect fabrication, a mold of a patient's dental arch may be fabricated from a digital model of the dental arch, and a shell may be formed over the mold (e.g., by thermoforming a polymeric sheet over the mold of the dental arch and then trimming the thermoformed polymeric sheet). The fabrication of the mold may be performed by a rapid prototyping machine (e.g., a stereolithography (SLA) 3D printer). The rapid prototyping machine may receive digital models of molds of dental arches and/or digital models of the appliances 712, 714, 716 after the digital models of the appliances 712, 714, 716 have been processed by processing logic of a computing device, such as the computing device in FIG. 6. The processing logic may include hardware (e.g., circuitry, dedicated logic, programmable logic, microcode, etc.), software (e.g., instructions executed by a processing device), firmware, or a combination thereof. For example, one or more operations may be performed by a processing device executing an aligner generator 650.

To manufacture the molds, a shape of a dental arch for a patient at a treatment stage is determined based on a treatment plan. In the example of orthodontics, the treatment plan may be generated based on an intraoral scan of a dental arch to be modeled. The intraoral scan of the patient's dental arch may be performed to generate a three dimensional (3D) virtual model of the patient's dental arch (mold). For example, a full scan of the mandibular and/or maxillary arches of a patient may be performed to generate 3D virtual models thereof. The intraoral scan may be performed by creating multiple overlapping intraoral images from different scanning stations and then stitching together the intraoral images to provide a composite 3D virtual model. In other applications, virtual 3D models may also be generated based on scans of an object to be modeled or based on use of computer aided drafting techniques (e.g., to design the virtual 3D mold). Alternatively, an initial negative mold may be generated from an actual object to be modeled (e.g., a dental impression or the like). The negative mold may then be scanned to determine a shape of a positive mold that will be produced.

Once the virtual 3D model of the patient's dental arch is generated, a dental practitioner may determine a desired treatment outcome, which includes final positions and orientations for the patient's teeth. Processing logic may then determine a number of treatment stages to cause the teeth to progress from starting positions and orientations to the target final positions and orientations. The shape of the final virtual 3D model and each intermediate virtual 3D model may be determined by computing the progression of tooth movement throughout orthodontic treatment from initial tooth placement and orientation to final corrected tooth placement and orientation. For each treatment stage, a separate virtual 3D model of the patient's dental arch at that treatment stage may be generated. The shape of each virtual 3D model will be different. The original virtual 3D model, the final virtual 3D model and each intermediate virtual 3D model is unique and customized to the patient.

Accordingly, multiple different virtual 3D models (digital designs) of a dental arch may be generated for a single patient. A first virtual 3D model may be a unique model of a patient's dental arch and/or teeth as they presently exist, and a final virtual 3D model may be a model of the patient's dental arch and/or teeth after correction of one or more teeth and/or a jaw. Multiple intermediate virtual 3D models may be modeled, each of which may be incrementally different from previous virtual 3D models.

Each virtual 3D model of a patient's dental arch may be used to generate a unique customized physical mold of the dental arch at a particular stage of treatment. The shape of the mold may be at least in part based on the shape of the virtual 3D model for that treatment stage. The virtual 3D model may be represented in a file such as a computer aided drafting (CAD) file or a 3D printable file such as a stereolithography (STL) file. The virtual 3D model for the mold may be sent to a third party (e.g., clinician office, laboratory, manufacturing facility or other entity). The virtual 3D model may include instructions that will control a fabrication system or device in order to produce the mold with specified geometries.

A clinician office, laboratory, manufacturing facility or other entity may receive the virtual 3D model of the mold, the digital model having been created as set forth above. The entity may input the digital model into a rapid prototyping machine. The rapid prototyping machine then manufactures the mold using the digital model. One example of a rapid prototyping manufacturing machine is a 3D printer. 3D printing includes any layer-based additive manufacturing processes. 3D printing may be achieved using an additive process, where successive layers of material are formed in proscribed shapes. 3D printing may be performed using extrusion deposition, granular materials binding, lamination, photopolymerization, continuous liquid interface production (CLIP), or other techniques. 3D printing may also be achieved using a subtractive process, such as milling.

In some instances, stereolithography (SLA), also known as optical fabrication solid imaging, is used to fabricate an SLA mold. In SLA, the mold is fabricated by successively printing thin layers of a photo-curable material (e.g., a polymeric resin) on top of one another. A platform rests in a bath of a liquid photopolymer or resin just below a surface of the bath. A light source (e.g., an ultraviolet laser) traces a pattern over the platform, curing the photopolymer where the light source is directed, to form a first layer of the mold. The platform is lowered incrementally, and the light source traces a new pattern over the platform to form another layer of the mold at each increment. This process repeats until the mold is completely fabricated. Once all of the layers of the mold are formed, the mold may be cleaned and cured.

Materials such as a polyester, a co-polyester, a polycarbonate, a polycarbonate, a thermopolymeric polyurethane, a polypropylene, a polyethylene, a polypropylene and polyethylene copolymer, an acrylic, a cyclic block copolymer, a polyetheretherketone, a polyamide, a polyethylene terephthalate, a polybutylene terephthalate, a polyetherimide, a polyethersulfone, a polytrimethylene terephthalate, a styrenic block copolymer (SBC), a silicone rubber, an elastomeric alloy, a thermopolymeric elastomer (TPE), a thermopolymeric vulcanizate (TPV) elastomer, a polyurethane elastomer, a block copolymer elastomer, a polyolefin blend elastomer, a thermopolymeric co-polyester elastomer, a thermopolymeric polyamide elastomer, or combinations thereof, may be used to directly form the mold. The materials used for fabrication of the mold can be provided in an uncured form (e.g., as a liquid, resin, powder, etc.) and can be cured (e.g., by photopolymerization, light curing, gas curing, laser curing, crosslinking, etc.). The properties of the material before curing may differ from the properties of the material after curing.

Appliances may be formed from each mold and when applied to the teeth of the patient, may provide forces to move the patient's teeth as dictated by the treatment plan. The shape of each appliance is unique and customized for a particular patient and a particular treatment stage. In an example, the appliances 712, 714, 716 can be pressure formed or thermoformed over the molds. Each mold may be used to fabricate an appliance that will apply forces to the patient's teeth at a particular stage of the orthodontic treatment. The appliances 712, 714, 716 each have teeth-receiving cavities that receive and resiliently reposition the teeth in accordance with a particular treatment stage.

In one embodiment, a sheet of material is pressure formed or thermoformed over the mold. The sheet may be, for example, a sheet of polymeric (e.g., an elastic thermopolymeric, a sheet of polymeric material, etc.). To thermoform the shell over the mold, the sheet of material may be heated to a temperature at which the sheet becomes pliable. Pressure may concurrently be applied to the sheet to form the now pliable sheet around the mold. Once the sheet cools, it will have a shape that conforms to the mold. In one embodiment, a release agent (e.g., a non-stick material) is applied to the mold before forming the shell. This may facilitate later removal of the mold from the shell. Forces may be applied to lift the appliance from the mold. In some instances, a breakage, warpage, or deformation may result from the removal forces. Accordingly, embodiments disclosed herein may determine where the probable point or points of damage may occur in a digital design of the appliance prior to manufacturing and may perform a corrective action.

Additional information may be added to the appliance. The additional information may be any information that pertains to the appliance. Examples of such additional information includes a part number identifier, patient name, a patient identifier, a case number, a sequence identifier (e.g., indicating which appliance a particular liner is in a treatment sequence), a date of manufacture, a clinician name, a logo and so forth. For example, after determining there is a probable point of damage in a digital design of an appliance, an indicator may be inserted into the digital design of the appliance. The indicator may represent a recommended place to begin removing the polymeric appliance to prevent the point of damage from manifesting during removal in some embodiments.

In some embodiments, a library of removal methods/patterns may be established and this library may be referenced when simulating the removal of the aligner in the numerical simulation. Different patients or production technicians may tend to remove aligners differently, and there might be a few typical patterns. For example: 1) some patients lift from the lingual side of posteriors first (first left and then right, or vice versa), and then go around the arch from left/right posterior section to the right/left posterior section; 2) similar to #1, but some other patients lift only one side of the posterior and then go around the arch; 3) similar to #1, but some patients lift from the buccal side rather than the lingual side of the posterior; 4) some patients lift from the anterior incisors and pull hard to remove the aligner; 5) some other patients grab both lingual and buccal side of a posterior location and pull out both sides at the same time; 6) some other patients grab a random tooth in the middle. The library can also include a removal guideline provided by the manufacturer of the aligner. Removal approach may also depend on presence or absence of attachments on teeth as some pf the above method may result in more comfortable way of removal. Based on the attachment situation on each tooth, it can be determined how each patient would probably remove an aligner and adapt that removal procedure for that patient in that specific simulation.

After an appliance is formed over a mold for a treatment stage, the appliance is removed from the mold (e.g., automated removal of the appliance from the mold), and the appliance is subsequently trimmed along a cutline (also referred to as a trim line). The processing logic may determine a cutline for the appliance. The determination of the cutline(s) may be made based on the virtual 3D model of the dental arch at a particular treatment stage, based on a virtual 3D model of the appliance to be formed over the dental arch, or a combination of a virtual 3D model of the dental arch and a virtual 3D model of the appliance. The location and shape of the cutline can be important to the functionality of the appliance (e.g., an ability of the appliance to apply desired forces to a patient's teeth) as well as the fit and comfort of the appliance. For shells such as orthodontic appliances, orthodontic retainers and orthodontic splints, the trimming of the shell may play a role in the efficacy of the shell for its intended purpose (e.g., aligning, retaining or positioning one or more teeth of a patient) as well as the fit of the shell on a patient's dental arch. For example, if too much of the shell is trimmed, then the shell may lose rigidity and an ability of the shell to exert force on a patient's teeth may be compromised. When too much of the shell is trimmed, the shell may become weaker at that location and may be a point of damage when a patient removes the shell from their teeth or when the shell is removed from the mold. In some embodiments, the cut line may be modified in the digital design of the appliance as one of the corrective actions taken when a probable point of damage is determined to exist in the digital design of the appliance.

On the other hand, if too little of the shell is trimmed, then portions of the shell may impinge on a patient's gums and cause discomfort, swelling, and/or other dental issues. Additionally, if too little of the shell is trimmed at a location, then the shell may be too rigid at that location. In some embodiments, the cutline may be a straight line across the appliance at the gingival line, below the gingival line, or above the gingival line. In some embodiments, the cutline may be a gingival cutline that represents an interface between an appliance and a patient's gingiva. In such embodiments, the cutline controls a distance between an edge of the appliance and a gum line or gingival surface of a patient.

Each patient has a unique dental arch with unique gingiva. Accordingly, the shape and position of the cutline may be unique and customized for each patient and for each stage of treatment. For instance, the cutline is customized to follow along the gum line (also referred to as the gingival line). In some embodiments, the cutline may be away from the gum line in some regions and on the gum line in other regions. For example, it may be desirable in some instances for the cutline to be away from the gum line (e.g., not touching the gum) where the shell will touch a tooth and on the gum line (e.g., touching the gum) in the interproximal regions between teeth. Accordingly, it is important that the shell be trimmed along a predetermined cutline.

FIG. 7C illustrates a method 750 of orthodontic treatment using a plurality of appliances, in accordance with embodiments. One or more of the plurality of appliances may be generated from simultaneous thermoforming of multiple aligners (e.g., two or more of the plurality of appliances may be simultaneously thermoformed using an aligner manufacturing system, as described herein). The method 750 can be practiced using any of the appliances or appliance sets described herein. In block 760, a first orthodontic appliance is applied to a patient's teeth in order to reposition the teeth from a first tooth arrangement to a second tooth arrangement. In block 770, a second orthodontic appliance is applied to the patient's teeth in order to reposition the teeth from the second tooth arrangement to a third tooth arrangement. The method 750 can be repeated as necessary using any suitable number and combination of sequential appliances in order to incrementally reposition the patient's teeth from an initial arrangement to a target arrangement. The appliances can be generated all at the same stage or in sets or batches (e.g., at the beginning of a stage of the treatment), or the appliances can be fabricated one at a time, and the patient can wear each appliance until the pressure of each appliance on the teeth can no longer be felt or until the maximum amount of expressed tooth movement for that given stage has been achieved. A plurality of different appliances (e.g., a set) can be designed and even fabricated prior to the patient wearing any appliance of the plurality.

After wearing an appliance for an appropriate period of time, the patient can replace the current appliance with the next appliance in the series until no more appliances remain. The appliances are generally not affixed to the teeth and the patient may place and replace the appliances at any time during the procedure (e.g., patient-removable appliances). The final appliance or several appliances in the series may have a geometry or geometries selected to overcorrect the tooth arrangement. For instance, one or more appliances may have a geometry that would (if fully achieved) move individual teeth beyond the tooth arrangement that has been selected as the "final." Such over-correction may be desirable in order to offset potential relapse after the repositioning method has been terminated (e.g., permit movement of individual teeth back toward their pre-corrected positions). Over-correction may also be beneficial to speed the rate of correction (e.g., an appliance with a geometry that is positioned beyond a desired intermediate or final position may shift the individual teeth toward the position at a greater rate). In such cases, the use of an appliance can be terminated before the teeth reach the positions defined by the appliance. Furthermore, over-correction may be deliberately applied in order to compensate for any inaccuracies or limitations of the appliance.

FIG. 8 illustrates a method 800 for designing an orthodontic appliance to be produced by direct fabrication, in accordance with embodiments. The method 800 can be applied to any embodiment of the orthodontic appliances described herein. Some or all of the blocks of the method 800 can be performed by any suitable data processing system or device, e.g., one or more processors configured with suitable instructions.

In block 810, a movement path to move one or more teeth from an initial arrangement to a target arrangement is determined. The initial arrangement can be determined from a mold or a scan of the patient's teeth or mouth tissue, e.g., using wax bites, direct contact scanning, x-ray imaging, tomographic imaging, sonographic imaging, and other techniques for obtaining information about the position and structure of the teeth, jaws, gums and other orthodontically relevant tissue. From the obtained data, a digital data set can be derived that represents the initial (e.g., pretreatment) arrangement of the patient's teeth and other tissues. Optionally, the initial digital data set is processed to segment the tissue constituents from each other. For example, data structures that digitally represent individual tooth crowns can be produced. Advantageously, digital models of entire teeth can be produced, including measured or extrapolated hidden surfaces and root structures, as well as surrounding bone and soft tissue.

The target arrangement of the teeth (e.g., a desired and intended end result of orthodontic treatment) can be received from a clinician in the form of a prescription, can be calculated from basic orthodontic principles, and/or can be extrapolated computationally from a clinical prescription. With a specification of the desired final positions of the teeth and a digital representation of the teeth themselves, the final position and surface geometry of each tooth can be specified to form a complete model of the tooth arrangement at the desired end of treatment.

Having both an initial position and a target position for each tooth, a movement path can be defined for the motion of each tooth. In some embodiments, the movement paths are configured to move the teeth in the quickest fashion with the least amount of round-tripping to bring the teeth from their initial positions to their desired target positions. The tooth paths can optionally be segmented, and the segments can be calculated so that each tooth's motion within a segment stays within threshold limits of linear and rotational translation. In this way, the end points of each path segment can constitute a clinically viable repositioning, and the aggregate of segment end points can constitute a clinically viable sequence of tooth positions, so that moving from one point to the next in the sequence does not result in a collision of teeth.

In block 820, a force system to produce movement of the one or more teeth along the movement path is determined. A force system can include one or more forces and/or one or more torques. Different force systems can result in different types of tooth movement, such as tipping, translation, rotation, extrusion, intrusion, root movement, etc. Biomechanical principles, modeling techniques, force calculation/measurement techniques, and the like, including knowledge and approaches commonly used in orthodontia, may be used to determine the appropriate force system to be applied to the tooth to accomplish the tooth movement. In determining the force system to be applied, sources may be considered including literature, force systems determined by experimentation or virtual modeling, computer-based modeling, clinical experience, minimization of unwanted forces, etc.

The determination of the force system can include constraints on the allowable forces, such as allowable directions and magnitudes, as well as desired motions to be brought about by the applied forces. For example, in fabricating palatal expanders, different movement strategies may be desired for different patients. For example, the amount of force needed to separate the palate can depend on the age of the patient, as very young patients may not have a fully-formed suture. Thus, in juvenile patients and others without fully-closed palatal sutures, palatal expansion can be accomplished with lower force magnitudes. Slower palatal movement can also aid in growing bone to fill the expanding suture. For other patients, a more rapid expansion may be desired, which can be achieved by applying larger forces. These requirements can be incorporated as needed to choose the structure and materials of appliances; for example, by choosing palatal expanders capable of applying large forces for rupturing the palatal suture and/or causing rapid expansion of the palate. Subsequent appliance stages can be designed to apply different amounts of force, such as first applying a large force to break the suture, and then applying smaller forces to keep the suture separated or gradually expand the palate and/or arch.

The determination of the force system can also include modeling of the facial structure of the patient, such as the skeletal structure of the jaw and palate. Scan data of the palate and arch, such as X-ray data or 3D optical scanning data, for example, can be used to determine parameters of the skeletal and muscular system of the patient's mouth, so as to determine forces sufficient to provide a desired expansion of the palate and/or arch. In some embodiments, the thickness and/or density of the mid-palatal suture may be measured, or input by a treating professional. In other embodiments, the treating professional can select an appropriate treatment based on physiological characteristics of the patient. For example, the properties of the palate may also be estimated based on factors such as the patient's age—for example, young juvenile patients will typically require lower forces to expand the suture than older patients, as the suture has not yet fully formed.

In block 830, appliance design for an orthodontic appliance configured to produce the force system is determined. Determination of the orthodontic appliance, appliance geometry, material composition, and/or properties can be performed using a treatment or force application simulation environment. A simulation environment can include, e.g., computer modeling systems, biomechanical systems or apparatus, and the like. Optionally, digital models of the appliance and/or teeth can be produced, such as finite element models. The finite element models can be created using computer program application software available from a variety of vendors. For creating solid geometry models, computer aided engineering (CAE) or computer aided design (CAD) programs can be used, such as the Auto-CAD® software products available from Autodesk, Inc., of San Rafael, CA. For creating finite element models and analyzing them, program products from a number of vendors can be used, including finite element analysis packages from ANSYS, Inc., of Canonsburg, PA, and SIMULIA (Abaqus) software products from Dassault Systèmes of Waltham, MA.

Optionally, one or more orthodontic appliances can be selected for testing or force modeling. As noted above, a desired tooth movement, as well as a force system required or desired for eliciting the desired tooth movement, can be identified. Using the simulation environment, a candidate orthodontic appliance can be analyzed or modeled for determination of an actual force system resulting from use of the candidate appliance. One or more modifications can optionally be made to a candidate appliance, and force modeling can be further analyzed as described, e.g., in order to iteratively determine an appliance design that produces the desired force system.

In block 840, instructions for fabrication of the orthodontic appliance incorporating the appliance design are generated. The instructions can be configured to control a fabrication system or device in order to produce the orthodontic appliance with the specified orthodontic appliance. In some embodiments, the instructions are configured for manufacturing the orthodontic appliance using direct fabrication (e.g., stereolithography, selective laser sintering, fused deposition modeling, 3D printing, continuous direct fabrication, multi-material direct fabrication, etc.), in accordance with the various methods presented herein. In alternative embodiments, the instructions can be configured for indirect fabrication of the appliance, e.g., by thermoforming. In some embodiments, the instructions for fabrication of the orthodontic appliance include instructions for simultaneous thermoforming of multiple orthodontic appliances (e.g., simultaneous thermoforming of multiple aligners using an aligner manufacturing system, as described herein).

Method 800 may comprise additional blocks: 1) The upper arch and palate of the patient is scanned intraorally to generate three dimensional data of the palate and upper arch; and/or 2) The three dimensional shape profile of the appliance is determined to provide a gap and teeth engagement structures as described herein.

Although the above blocks show a method 800 of designing an orthodontic appliance in accordance with some embodiments, a person of ordinary skill in the art will recognize some variations based on the teaching described herein. Some of the blocks may comprise sub-blocks. Some of the blocks may be repeated as often as desired. One or more blocks of the method 800 may be performed with any suitable fabrication system or device, such as the embodiments described herein. Some of the blocks may be optional, and the order of the blocks can be varied as desired.

Figure 9:
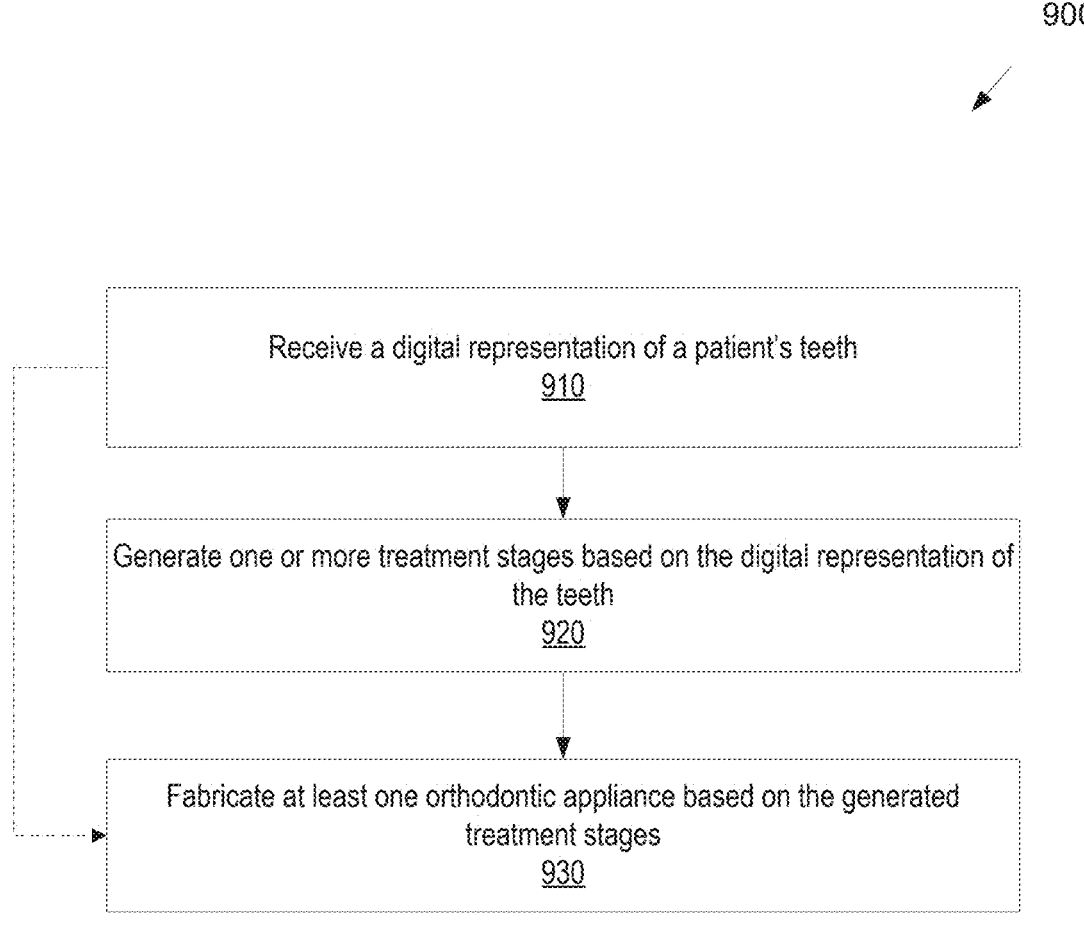
FIG. 9 illustrates a method for digitally planning an orthodontic treatment, according to certain embodiments.

FIG. 9 illustrates a method 900 for digitally planning an orthodontic treatment and/or design or fabrication of an appliance, in accordance with embodiments. The method

900 can be applied to any of the treatment procedures described herein and can be performed by any suitable data processing system.

In block 910, a digital representation of a patient's teeth is received. The digital representation can include surface topography data for the patient's intraoral cavity (including teeth, gingival tissues, etc.). The surface topography data can be generated by directly scanning the intraoral cavity, a physical model (positive or negative) of the intraoral cavity, or an impression of the intraoral cavity, using a suitable scanning device (e.g., a handheld scanner, desktop scanner, etc.).

In block 920, one or more treatment stages are generated based on the digital representation of the teeth. The treatment stages can be incremental repositioning stages of an orthodontic treatment procedure designed to move one or more of the patient's teeth from an initial tooth arrangement to a target arrangement. For example, the treatment stages can be generated by determining the initial tooth arrangement indicated by the digital representation, determining a target tooth arrangement, and determining movement paths of one or more teeth in the initial arrangement necessary to achieve the target tooth arrangement. The movement path can be optimized based on minimizing the total distance moved, preventing collisions between teeth, avoiding tooth movements that are more difficult to achieve, or any other suitable criteria.

In block 930, at least one orthodontic appliance is fabricated based on the generated treatment stages. For example, a set of appliances can be fabricated, each shaped according a tooth arrangement specified by one of the treatment stages, such that the appliances can be sequentially worn by the patient to incrementally reposition the teeth from the initial arrangement to the target arrangement. The appliance set may include one or more of the orthodontic appliances described herein. The fabrication of the appliance may involve creating a digital model of the appliance to be used as input to a computer-controlled fabrication system. The appliance can be formed using direct fabrication methods, indirect fabrication methods, or combinations thereof, as desired. The fabrication of the appliance may include simultaneous thermoforming of multiple appliances (e.g., simultaneous thermoforming of multiple aligners via aligner manufacturing system 100, as described herein).

In some instances, staging of various arrangements or treatment stages may not be necessary for design and/or fabrication of an appliance. As illustrated by the dashed line in FIG. 9, design and/or fabrication of an orthodontic appliance, and perhaps a particular orthodontic treatment, may include use of a representation of the patient's teeth (e.g., receive a digital representation of the patient's teeth at block 910), followed by design and/or fabrication of an orthodontic appliance based on a representation of the patient's teeth in the arrangement represented by the received representation.

It is to be understood that the above description is intended to be illustrative, and not restrictive. Many other embodiments will be apparent upon reading and understanding the above description. Although embodiments of the present disclosure have been described with reference to specific example embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method of manufacturing multiple aligners simultaneously, the method comprising:

receiving a first digital model and a second digital model associated with a dental arch of a patient corresponding to a first stage and a second stage of an orthodontic treatment;

printing a first mold of a first dental arch based on the first digital model and a second mold of a second dental arch based on the second digital model;

securing the first mold of the first dental arch and the second mold of the second dental arch to a plate;

heating, via a heater, a sheet of plastic to generate a heated sheet, and surrounding the sheet of plastic with a mask during the heating of the sheet of plastic to minimize heat transfer to other sheets of plastic and to substantially provide a thermal seal between the heater and the sheet of plastic, wherein the mask is heat resistant up to about 500 degrees Fahrenheit; and simultaneously thermoforming the heated sheet over the first mold of the first dental arch and the second mold of the second dental arch to form a first aligner shaped to fit the first dental arch and a second aligner shaped to fit the second dental arch.

2. The method of claim 1 further comprising:

determining whether a size of a third mold of a third dental arch is below a threshold size;

responsive to determining the size is below the threshold size, thermoforming a third aligner shaped to fit the third dental arch simultaneously with another aligner; and responsive to determining the size is above the threshold size, thermoforming the third aligner by itself.

3. The method of claim 1 further comprising:

piercing, using a plurality of holding pins of a pallet, the sheet of plastic to secure the sheet of plastic to the pallet during the heating and the simultaneously thermoforming.

4. The method of claim 1, wherein the securing of the first mold and the second mold to the plate is via:

a corresponding pin to secure a corresponding mold in an x-direction and a y-direction;

a corresponding feature, wherein the corresponding mold is to be placed on the plate to cause a top portion of the corresponding feature to extend through a hole formed by the corresponding mold, wherein the top portion of the corresponding feature is to be rotated to secure the corresponding mold in a z-direction; and a corresponding keyway to maintain orientation of the corresponding mold.

5. The method of claim 1, wherein the securing of the first mold and the second mold to the plate is in a predetermined position, a predetermined orientation, and predetermined distances from inner walls of a thermoforming chamber.

6. The method of claim 1 further comprising securing, using a pallet comprising a plurality of holding pins, the sheet of plastic to the pallet during the heating and during the simultaneously thermoforming, wherein the plurality of holding pins comprises a corresponding holding pin at each corner of the sheet of plastic configured to pierce the sheet of plastic.

7. The method of claim 1, wherein:

the mask is an insulator;

the mask does not adhere to the heated sheet; and the mask comprises polytetrafluoroethylene (PTFE).

8. A method of manufacturing multiple aligners simultaneously, the method comprising:

determining a first size of a first mold of a first dental arch and a second size of a second mold of a second dental arch;

selecting a first plate, a first sheet of plastic, and a first pallet based on at least one of the first size or the second size;

causing the first mold and the second mold to be secured to the first plate;

causing the first sheet of plastic to be heated, by a heater, to generate a first heated sheet, and causing the first sheet of plastic to be surrounded with a mask during heating of the first sheet of plastic to minimize heat transfer to other sheets of plastic and to substantially provide a thermal seal between the heater and the first sheet of plastic, wherein the mask is heat resistant up to about 500 degrees Fahrenheit; and causing the first heated sheet to be simultaneously thermoformed over the first mold of the first dental arch and the second mold of the second dental arch to form a first aligner shaped to fit the first dental arch and a second aligner shaped to fit the second dental arch.

9. The method of claim 8 further comprising:

determining a third size of a third mold of a third dental arch and a fourth size of a fourth mold of a fourth dental arch;

selecting a second plate, a second sheet of plastic, and a second pallet based on at least one of the third size or the fourth size, wherein the second plate has a different size than the first plate, the second sheet of plastic has a different size than the first sheet of plastic, and the second pallet has a different size than the first pallet; and causing, using the second plate, the second sheet of plastic, and the second pallet, a third aligner and a fourth aligner to be formed.

10. The method of claim 8 further comprising laterally moving, via a conveyor system, the first plate to a loading station to receive the first sheet of plastic, to a heating station to heat the first sheet of plastic, and to a thermoforming station to thermoform the first heated sheet.

11. The method of claim 8 further comprising rotationally moving, via a dial system, the first plate to a loading station to receive the first sheet of plastic, to a heating station to heat the first sheet of plastic, and to a thermoforming station to thermoform the first heated sheet.

12. The method of claim 8, wherein the causing of the first mold and the second mold to be secured to the first plate is via:

a corresponding pin to secure a corresponding mold in an x-direction and a y-direction;

a corresponding feature, wherein the corresponding mold is to be placed on the first plate to cause a top portion of the corresponding feature to extend through a hole formed by the corresponding mold, wherein the top portion of the corresponding feature is to be rotated to secure the corresponding mold in a z-direction; and a corresponding keyway to maintain orientation of the corresponding mold.

13. The method of claim 8, wherein the causing of the first mold and the second mold to be secured to the first plate is in a predetermined position, a predetermined orientation, and predetermined distances from inner walls of a thermoforming chamber.

14. The method of claim 8 further comprising causing a plurality of holding pins of a pallet to pierce the first sheet of plastic to secure the first sheet of plastic to the pallet during the heating and simultaneously thermoforming, wherein the plurality of holding pins comprises a corresponding holding pin at each corner of the first sheet of plastic configured to pierce the first sheet of plastic.

15. The method of claim 8, wherein:
the mask is an insulator;
the mask does not adhere to the heated first sheet of plastic; and
the mask comprises polytetrafluoroethylene (PTFE).

16. A method comprising:
causing a sheet of plastic to be secured between a pallet and a lower surface of a heat mask, an upper surface of the heat mask being coupled with a heater of an aligner manufacturing system, a plurality of inner sidewalls of the heat mask forming recesses, a first portion of the sheet of plastic being disposed on the pallet and exposed by the recesses of the heat mask, a second portion of the sheet of plastic being disposed on the pallet and covered by the heat mask;
causing, via the heater, heat transfer to the first portion of the sheet of plastic to generate a heated first portion, wherein the heat transfer from the heater to the second portion of the sheet of plastic is minimized by the heat mask, wherein the heat mask is to substantially provide a thermal seal between the heater and the sheet of plastic, and wherein the heat mask is heat resistant up to about 500 degrees Fahrenheit; and
causing the heated first portion of the sheet of plastic to be simultaneously thermoformed over a first mold of a first dental arch and a second mold of a second dental arch to form a first aligner shaped to fit the first dental arch and a second aligner shaped to fit the second dental arch.

17. The method of claim 16 further comprising causing of the first mold and the second mold to be secured to a plate is via:
a corresponding pin to secure a corresponding mold in an x-direction and a y-direction;
a corresponding feature, wherein the corresponding mold is to be placed on the plate to cause a top portion of the corresponding feature to extend through a hole formed by the corresponding mold, wherein the top portion of the corresponding feature is to be rotated to secure the corresponding mold in a z-direction; and
a corresponding keyway to maintain orientation of the corresponding mold.

18. The method of claim 16 further comprising causing of the first mold and the second mold to be secured to a plate in a predetermined position, a predetermined orientation, and predetermined distances from inner walls of a thermoforming chamber.

19. The method of claim 16 further comprising causing a plurality of holding pins of the pallet to pierce the sheet of plastic to secure the sheet of plastic to the pallet during heating and thermoforming, wherein the plurality of holding pins comprises a corresponding holding pin at each corner of the sheet of plastic configured to pierce the sheet of plastic.

20. The method of claim 16, wherein:
the heat mask is an insulator;
the heat mask does not adhere to the heated first portion of the sheet of plastic; and
the heat mask comprises polytetrafluoroethylene (PTFE).

* * * * *